(12) United States Patent
Uetabira

(10) Patent No.: US 11,945,257 B2
(45) Date of Patent: Apr. 2, 2024

(54) PORTABLE TYPE CALENDAR AND NOTEBOOK

(71) Applicant: INTERMAN Corporation, Kagoshima (JP)

(72) Inventor: Mitsugu Uetabira, Kagoshima (JP)

(73) Assignee: INTERMAN Corporation, Kagoshima (JP)

( * ) Notice: Subject to any disclaimer, the term of this patent is extended or adjusted under 35 U.S.C. 154(b) by 0 days.

(21) Appl. No.: 18/075,650

(22) Filed: Dec. 6, 2022

(65) Prior Publication Data
US 2023/0096551 A1    Mar. 30, 2023

Related U.S. Application Data

(62) Division of application No. 17/281,696, filed as application No. PCT/JP2019/037152 on Sep. 23, 2019, now abandoned.

(30) Foreign Application Priority Data

Oct. 9, 2018  (JP) .................................. 2018-191095
Oct. 20, 2018 (JP) .................................. 2018-198003
(Continued)

(51) Int. Cl.
B42D 15/00 (2006.01)
B42D 5/04 (2006.01)
(Continued)

(52) U.S. Cl.
CPC ......... B42D 5/042 (2013.01); B42D 15/0006 (2013.01); B42D 15/008 (2013.01); G06V 10/19 (2022.01); G06V 30/10 (2022.01)

(58) Field of Classification Search
CPC .... G06V 10/19; G06V 10/22; B42D 15/0006; B42D 15/008
(Continued)

(56) References Cited

U.S. PATENT DOCUMENTS 5,169,175 A * 12/1992 Jerkunica ............... B42D 1/009
283/41
5,984,362 A * 11/1999 Christman ............. G09B 29/10
283/34
(Continued)

FOREIGN PATENT DOCUMENTS

DE      10156761 A1   5/2003
EP       1833022 A1   9/2007
(Continued)

OTHER PUBLICATIONS

KR200190191Y1 English Translation (Year: 2000).*
(Continued)

*Primary Examiner* — Kyle R Grabowski
(74) *Attorney, Agent, or Firm* — Maier & Maier, PLLC

(57) ABSTRACT

In each page of a calendar or a notebook in which a rectangle paper is folded in eight with one side thereof divided into four equal parts and the other side thereof divided into two equal parts and each of front and rear regions of the rectangle paper divided into equal parts by folded lines serves as a page, an identifier which enables specification of the position of the page in the whole rectangle paper is printed. The identifier includes, for example, a combination of alphabets, numerals, and colors. In another embodiment, the identifier is an icon printed at a corner of each page. The icon has a high density portion, and the position of the page with respect to the whole rectangle paper is expressed as the position of the high density portion with respect to the whole icon.

3 Claims, 40 Drawing Sheets

(30) Foreign Application Priority Data

Jun. 24, 2019 (JP) .............................. 2019-013881D
Jun. 24, 2019 (JP) .............................. 2019-013882D

(51) Int. Cl.
*G06V 10/10* (2022.01)
*G06V 30/10* (2022.01)

(58) Field of Classification Search
USPC ........................ 283/2–4, 34, 35, 37; 382/173
See application file for complete search history.

(56) References Cited

U.S. PATENT DOCUMENTS

| | | | |
|---|---|---|---|
| 8,690,062 B1 | 4/2014 | Qureshi | |
| 10,102,464 B2 | 10/2018 | Deschenes | |
| 2002/0101072 A1* | 8/2002 | Infield | G09B 29/10 283/34 |
| 2002/0175516 A1* | 11/2002 | Shulman | B42D 15/008 283/63.1 |
| 2009/0034845 A1 | 2/2009 | Saund | |
| 2011/0205370 A1 | 8/2011 | Griffin et al. | |
| 2014/0103630 A1* | 4/2014 | Hirahara | B42D 5/041 283/2 |
| 2016/0364636 A1* | 12/2016 | Kosinski, II | B42F 13/22 |

FOREIGN PATENT DOCUMENTS

| | | | | |
|---|---|---|---|---|
| GB | 2267056 A | * | 11/1993 | ........... B42D 15/008 |
| JP | H04173399 A | | 6/1992 | |
| JP | 3049498 U | | 6/1998 | |
| JP | 2001121848 A | | 5/2001 | |
| JP | 2003018393 A | * | 1/2003 | |
| JP | 2003018393 A | | 1/2003 | |
| JP | 2003276361 A | * | 9/2003 | |
| JP | 2009039969 A | | 2/2009 | |
| JP | 5020417 B1 | | 9/2012 | |
| JP | 2014091293 A | | 5/2014 | |
| KR | 200190191 Y1 | * | 7/2000 | |

OTHER PUBLICATIONS

International Search Report and Written Opinion dated Nov. 12, 2019 in corresponding International Application No. PCT/JP2019/037152; 16 pages.

* cited by examiner

| February | | | | | | | |
|---|---|---|---|---|---|---|---|
| Sun | Mon | Tue | Wed | Thu | Fri | Sat | |
| 27 | 28 | 29 | 30 | 31 | 1 | 2 | |
| 3 | 4 | 5 | 6 | 7 | 8 | 9 | |
| 10 | 11 | 12 | 13 | 14 | 15 | 16 | |
| 17 | 18 | 19 | 20 | 21 | 22 | 23 | |
| 24 | 25 | 26 | 27 | 28 | | | |

| March | | | | | | | |
|---|---|---|---|---|---|---|---|
| Sun | Mon | Tue | Wed | Thu | Fri | Sat | |
| 27 | 28 | 29 | 30 | 31 | 1 | 2 | |
| 3 | 4 | 5 | 6 | 7 | 8 | 9 | |
| 10 | 11 | 12 | 13 | 14 | 15 | 16 | |
| 17 | 18 | 19 | 20 | 21 | 22 | 23 | |
| 24/31 | 25 | 26 | 27 | 28 | 29 | 30 | |

Front Side

Back Side

PORTABLE TYPE CALENDAR AND NOTEBOOK

CROSS-REFERENCE TO RELATED APPLICATIONS

This application is a divisional of U.S. patent application Sere. No. 17/281,696, filed Mar. 31, 2021, which claims priority to and the benefit of Japanese Patent Application No. 2018-191095, filed Oct. 9, 2018, Japanese Patent Application No. 2018-198003, filed Oct. 20, 2018, Japanese Patent Application No. 2019-013881D, filed June 24, 2019, and Japanese Patent Application No. 2019-013882D, filed Jun. 24, 2019, the entire contents of which are incorporated herein by reference.

FIELD

The present invention relates to a portable type calendar in which a user can freely enter and browse a schedule and memoranda over months, and a notebook on which a user can easily and effectively write relevant items over a plurality of pages.

BACKGROUND

Dates appear in a calendar as well as weekdays, public holidays and so forth. A typical calendar sold in Japan contains national holidays, and often Rokuyo (six days of the Buddhist calendar). Furthermore, there is a calendar in which the ages or revolutions of the moon are displayed (Patent Document 1).

With respect to forms of calendars, while there are electronic calendars which automatically display dates, many calendars which are usually used are in the form of paper-made booklets such as daily, monthly or weekly pad type calendars. Actually, as one of purposes, calendars are used instead of a schedule or a memorandum book so that it is important to freely write.

On the other hand, generally speaking, a notebook is an article of stationery having a plurality of paper sheets bundled up with metal staples or glue. Notebook is sometimes called a notepad, a writing pad, or the like. In the broadest sense, a pocket-book and a diary may be called a notebook.

Usually, while a notebook is used with paper sheets being bundled, memorandum pads, letter paper, writing paper or the like from which are separated one sheet when used are not called a notebook. In many cases, a notebook is used for a certain purpose by writing down relevant items to save information together. For example, learning notebooks, experiment notebooks and the like have been used (Patent Document 2).

PRIOR ART LITERATURE

Patent Document

[Patent Document 1] Patent Publication No. 5020417
[Patent Document 2] Japanese Unexamined Patent Application Publication No. 2001-121848

SUMMARY

In the case where a calendar is used in place of a schedule or a memorandum book, the portability is a concern. While there are calendars in the form of posters, each sheet being provided for whole year, those are not suitable for portable use. On the other hand, while one card can be assigned to one month, it is unsuited for carrying all the cards which tend to scatter. Furthermore, a calendar contained in a pocket-book provides good portability but is not suitable for browsing or writing over months.

On the other hand, a conventional notebook is made by binding sheets so that, when writing relevant items over a plurality of pages, it is inconvenient to mutually refer to items by turning one after another. Also, in the case where it is desired to save, as digital data, written contents of a used notebook, each page has to be scanned or imaged so that it takes a great deal of time.

It is therefore an object of the present invention to provide a portable calendar which is compact and has excellent portability and make it easy to freely view or write over a plurality of pages.

In addition, it is another object of the present invention to provide a notebook which is excellent in browsability and portability and make it possible to easily and effectively write relevant items over a plurality of pages.

In order to accomplish the object as described above, a portable calendar according to one aspect of the present invention comprises a rectangular paper sheet folded in eight in order that the rectangular paper sheet is divided into four equal parts along a longer side of the rectangular paper sheet and divided into two equal parts along a shorter side of the rectangular paper sheet, wherein the rectangular paper sheet is equally partitioned by folding lines into areas in which twelve months of one year are printed respectively, and wherein January through June are printed in the front side of the rectangular paper sheet, and July through December are printed in the back side of the rectangular paper sheet.

Also, in accordance with an embodiment, December of the previous year is further printed in the front side of the rectangular paper sheet, and January of the next year is further printed in the back side of the rectangular paper sheet.

In accordance with another aspect of the present invention, a notebook comprises a rectangular paper sheet folded in eight or sixteen in order that the rectangular paper sheet is divided into four equal parts along one side of the rectangular paper sheet and divided into two or four equal parts along the other side of the rectangular paper sheet, wherein each of front and back sides of the rectangular paper sheet is equally partitioned by folding lines into areas each of which serves as a page in which is printed a regular pattern vertically or horizontally arranged to aid in writing characters and the like in an aligned fashion, and wherein an identifier is printed on each page in order to identify the position of the each page in the entirety of the rectangular paper sheet.

Also, in accordance with an embodiment, the identifier comprises an alphabetic character, a numeral, a color or a combination thereof.

In accordance with a further embodiment, the identifier comprises an icon printed on one corner of each page and having a high density area whose position in the entirety of the icon corresponds to the position of the each page in the entirety of the rectangular paper sheet.

Furthermore, in accordance with one aspect of the present invention, a stationery comprises a rectangular paper sheet folded in eight or sixteen in order that the rectangular paper sheet is divided into four equal parts along one side of the rectangular paper sheet and divided into two or four equal parts along the other side of the rectangular paper sheet, wherein each of front and back sides of the rectangular paper sheet is equally partitioned by folding lines into areas each of which serves as a page, wherein an identifier is printed on each page in order to identify the position of the each page in the entirety of the rectangular paper sheet, wherein the identifier comprises an icon printed on one corner of each page, and wherein the icon represents the entirety of the rectangular sheet as a reduced area in which the position corresponding to the page is visually differentiated in order that it can be discerned.

Still further, in accordance with another aspect of the present invention, a page imaging segmentation application program to be installed in a smartphone and used for a stationary comprises a rectangular paper sheet folded in eight or sixteen in order that the rectangular paper sheet is divided into four equal parts along one side of the rectangular paper sheet and divided into two or four equal parts along the other side of the rectangular paper sheet, wherein each of front and back sides of the rectangular paper sheet is equally partitioned by folding lines into areas each of which serves as a page in which writing can be performed, and wherein the page imaging segmentation application causes the smartphone to function as an image acquisition means for taking an image of the entirety of the rectangular paper sheet and acquiring the taken image as an entire image, an image analysis separation means for analyzing the entire image, separating the entire image into an image of each page and acquiring the separated image for each page, and a separated image storage means for storing each separated image with a name assigned to distinguish the separated images from each other.

Effects of the Invention

The portable calendar in accordance with the present invention is compact and has excellent portability and make it easy to freely view or write over a plurality of pages.

Also, the notebook in accordance with the present invention makes it possible to easily and effectively write relevant items over a plurality of pages. Furthermore, the notebook in accordance with the present invention is excellent in browsability and portability.

BRIEF DESCRIPTION OF DRAWINGS

FIG. 2 is an expanded view for showing the portable calendar 1 in accordance with the embodiment 1 of the present invention and showing January through June printed in the front side.

FIG. 3 is an expanded view for showing the portable calendar 1 in accordance with the embodiment 1 of the present invention and showing July through December printed in the back side.

FIG. 4 is a schematic view for showing spread pages of the portable calendar 1 once opened in accordance with the embodiment 1 of the present invention.

FIG. 5 is a schematic view for showing January, February and March (and December of the previous year) of the portable calendar 1 further opened in accordance with the embodiment 1 of the present invention.

FIG. 6 is an expanded views for showing a portable calendar 2 in accordance with an embodiment 2 of the present invention and showing January through June printed in the front side.

FIG. 7 is an expanded views for showing the portable calendar 2 in accordance with the embodiment 2 of the present invention and showing July through December printed in the back side.

FIG. 8 is an expanded views for showing a portable calendar 3 in accordance with an embodiment 3 of the present invention and showing January through June printed in the front side.

FIG. 9 is an expanded views for showing the portable calendar 3 in accordance with the embodiment 3 of the present invention and showing July through December printed in the back side.

FIG. 11 is an expanded views for showing a portable calendar 4 in accordance with an embodiment 4 of the present invention and showing January through June printed in the front side.

FIG. 12 is an expanded views for showing the portable calendar 4 in accordance with the embodiment 4 of the present invention and showing July through December printed in the back side.

FIG. 13 is an expanded views for showing a portable calendar 5 in accordance with an embodiment 5 of the present invention and showing January through June printed in the front side.

FIG. 14 is an expanded views for showing the portable calendar 5 in accordance with the embodiment 5 of the present invention and showing July through December printed in the back side.

FIG. 18 is an expanded view for showing a notebook 12 in accordance with an embodiment 7 of the present invention and showing sixteen pages printed in the front side.

FIG. 19 is an expanded view for showing the notebook 12 in accordance with the embodiment 7 of the present invention and showing sixteen pages printed in the back side.

FIG. 35 is a schematic diagram for showing a use state of the notebook 16 in accordance with the embodiment 12 and showing the eight folded state of the notebook into a small size so that only one page can be used.

DETAILED DESCRIPTION

In what follows, portable calendars in accordance with several embodiments of the present invention will be explained with reference to the accompanying drawings. Incidentally, while black-and-white drawings are referred to in the following embodiments, the real portable calendar is printed in many colors. Specifically, "Sun" indicative of Sunday and dates (numerals) corresponding to Sunday are printed in red, and "Sat" indicative of Saturday and dates (numerals) corresponding to Saturday are printed in blue. The other dates (numerals) are printed in black. Needless to say, this is only an example, and the entirety of the portable calendar can be printed in black/white, or any other coloring can be applied. Also, the size of the embodiments of the portable calendars as described below is A2 in a fully expanded state. However, the present invention is not limited thereto. For example, the size may be A1, B2 or A3 in a fully expanded state.

Embodiment 1

Figure 1:
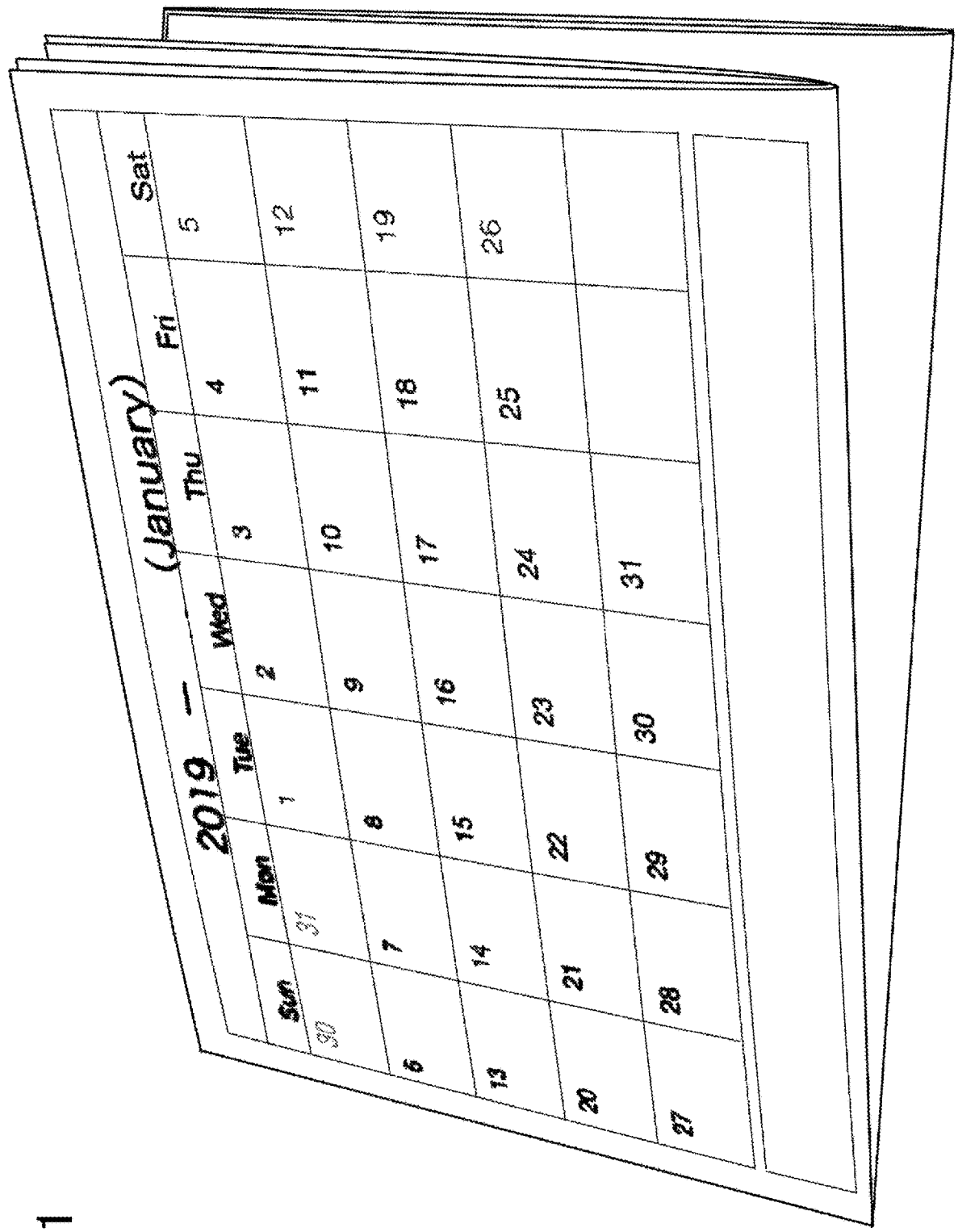
FIG. 1 is a perspective view for showing a portable calendar 1 in accordance with an embodiment 1 of the present invention.
Figure 2:
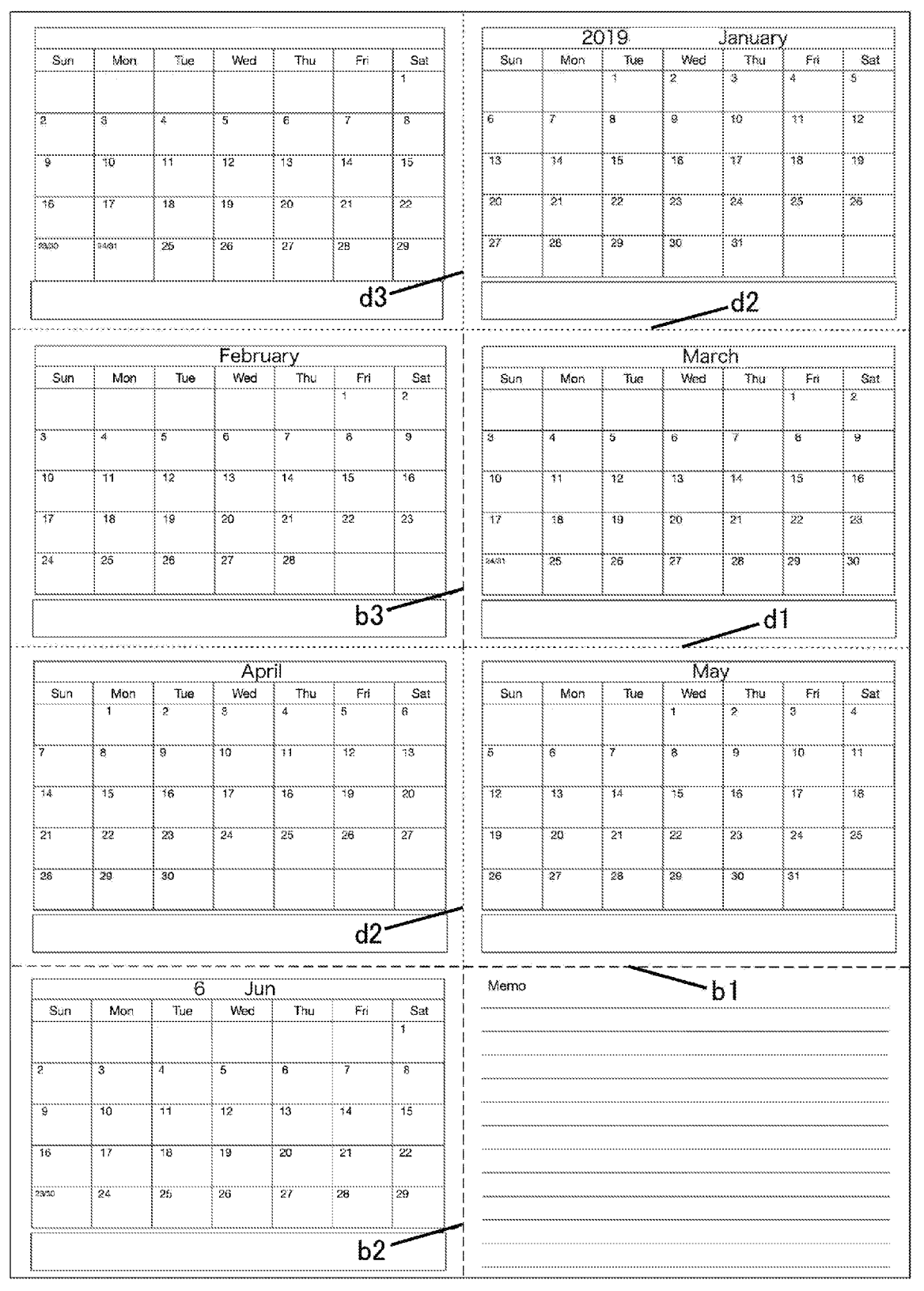
Figure 3:
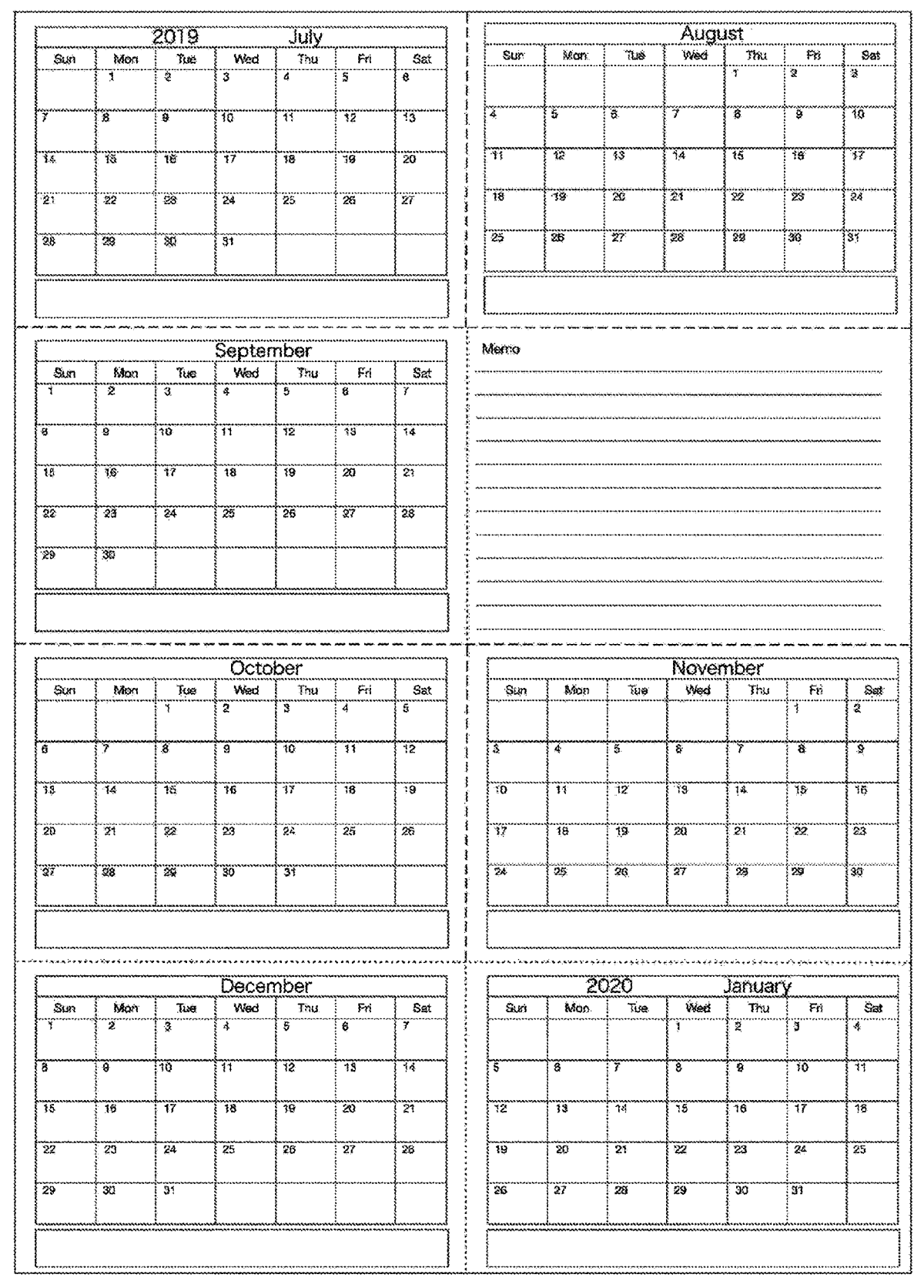

FIG. 1 is a perspective view for showing a portable calendar 1 in accordance with an embodiment 1 of the present invention. This portable calendar 1 is made of a quality paper in format A2 on which a calendar system is printed and which is folded in eight. Also, FIG. 2 and FIG. 3 are expanded views having a relationship of front-and-back to each other. As illustrated in FIG. 2 and FIG. 3, this portable calendar can display six months of the calendar system in a fully expanded state. Namely, January through June of the calendar are printed in the front side, and July through December of the calendar are printed in the back side.

In the front side of this portable calendar 1, December of the previous year is printed in the upper left corner thereof, and a memorandum space is provided in the lower right corner thereof. Furthermore, in the back side of this portable calendar 1, January of the next year is printed in the lower right corner thereof, and a memorandum space is provided in the second upper section of the left column thereof.

In the expanded views of FIG. 2 and FIG. 3, dotted lines show the mountain fold, and broken lines show the valley fold. These dotted lines and broken lines are not printed in the real product. The eight-folded state as illustrated in FIG. 1 is made from the fully-opened state as illustrated in FIG. 2 and FIG. 3, first, by mountain folding the paper along dotted line d1 to form a two-folded state. Next, the two-folded paper is mountain folded along dotted line d2, and at the same time valley folded along broken line b1 to form a four-folded state. Finally, the four-folded paper is mountain folded along dotted lines d2 and d3, and at the same time valley folded along broken lines b2 and b3 to form an eight-folded state.

Figure 5:
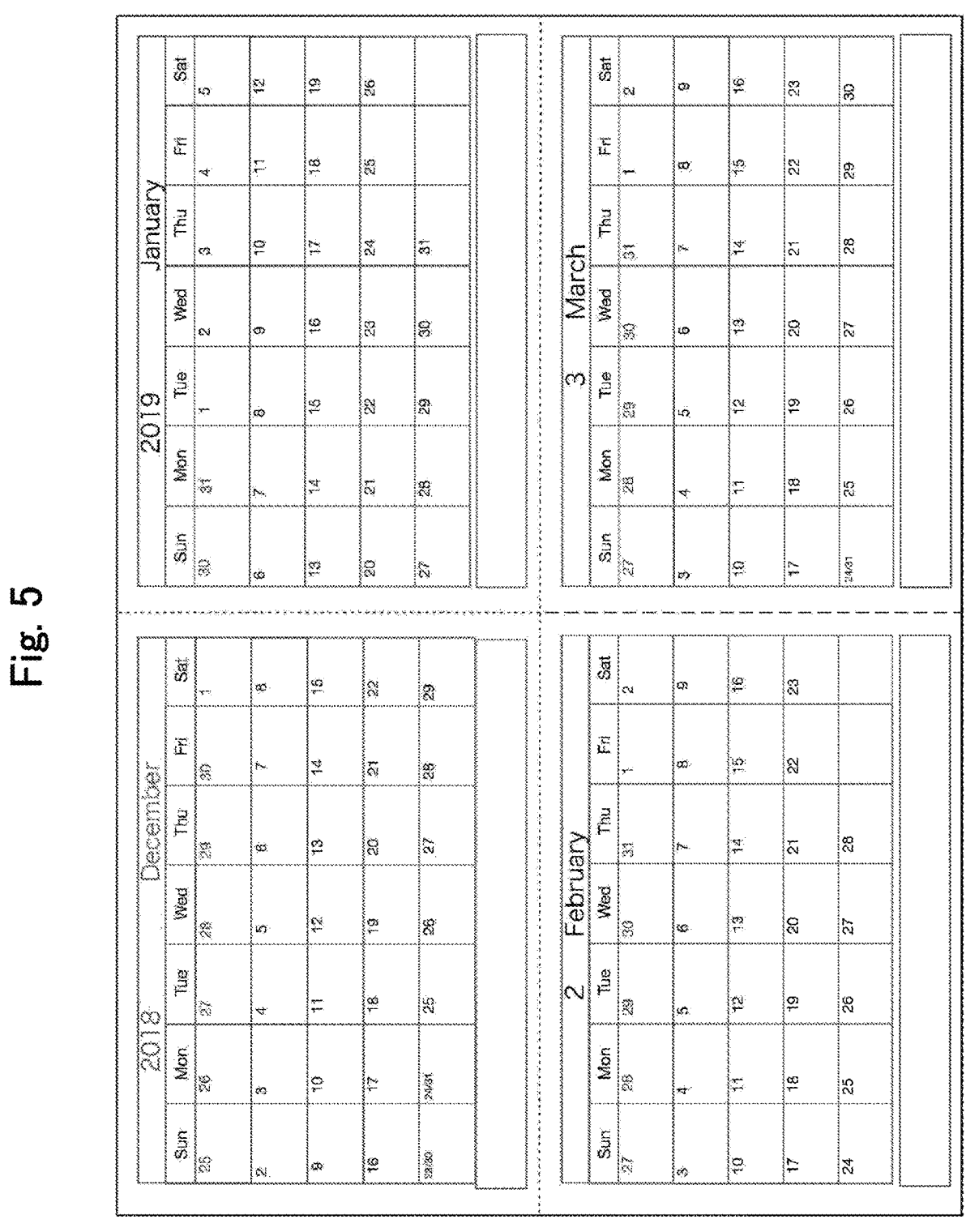

The product for sale is in the form as illustrated in FIG. 1 such that January is displayed (the paper is folded in eight into the smallest state). In this state, while January is displayed in the front side, December of the previous year is displayed in the back side. When this folded state is once opened, February and March are displayed to face each other. When opening again therefrom, January, February, March (and December of the previous) can be viewed through (FIG. 5). When fully expanded into the state of the A2 size, 6 months can be viewed through.

The folding lines, i.e., the mountain folding lines and the valley folding lines as illustrated in FIG. 2 and FIG. 3 correspond to an initially suggested way of folding. However, in practice, any folding way is possible in accordance with the actual situation. The paper can be freely folded to display a necessary month(s) in the front side. Accordingly, a plurality of months of the calendar can be viewed, and it is possible to write a memo or the like through months.

It is sometimes desired to store the schedule and memoranda written on the portable calendar after use for the purpose of confirmation in the future or the like. In such a case, the portable calendar itself may be stored. However, it is significantly convenient for handling if the schedule and memoranda can be saved as digital data.

Conventionally, the schedule and memoranda are monthly saved by scanning or taking an image of the portable calendar. In this case, for one year, scanning or photographing has to be repeated twelve times, and the image has to be saved by giving a name every time. This process takes time and therefore is substantially cumbersome. In the case of the portable calendar 1 according to the present invention, this process can be done in one step by the use of a utility program for smartphone. In what follows, this utility program will be explained.

In recent years, there are many smartphones having a camera with a resolution of over twenty million pixels. The image taken by such a camera can be clearly displayed up to details even expanded. Accordingly, when an image is taken of the entirety of the portable calendar 1 which is fully opened into the state of the A2 size, even small written contents can be clearly viewed by expansion.

After invoking the utility program, the user pushes the shutter of the camera of the smartphone with the timing when the entirety of the A2 size paper is captured. The utility program then analyzes the taken image, and detects the position of each month. For example, the utility program identifies areas partitioned with dotted lines and broken lines as illustrated in FIG. 2 and FIG. 3. However, since these dotted lines and broken lines are not printed in the real product, beltlike blank spaces (along the folding lines) are identified.

Then, the image is divided into eight equal parts and saved as eight data items (files). At this time, the year of the Christian era and the months are identified by character-recognition so that it is decided which part corresponds to which month. For example, the file corresponding to January, 2019 is saved as 201901.jpg to distinguish these files from each other. The file corresponding to December of the previous year, the file corresponding to January of the next year, and the files corresponding to the memorandum spaces are saved as 201812P.jpg, 202001N.jpg, 2019MEMOF.jpg and 2019MEMOB.jpg respectively. Accordingly, it is possible to store one year's schedule and memoranda as separate monthly files only by opening the portable calendar into the state of the A2 size and taking entire images of front and back sides thereof.

Embodiment 2

Figure 6:
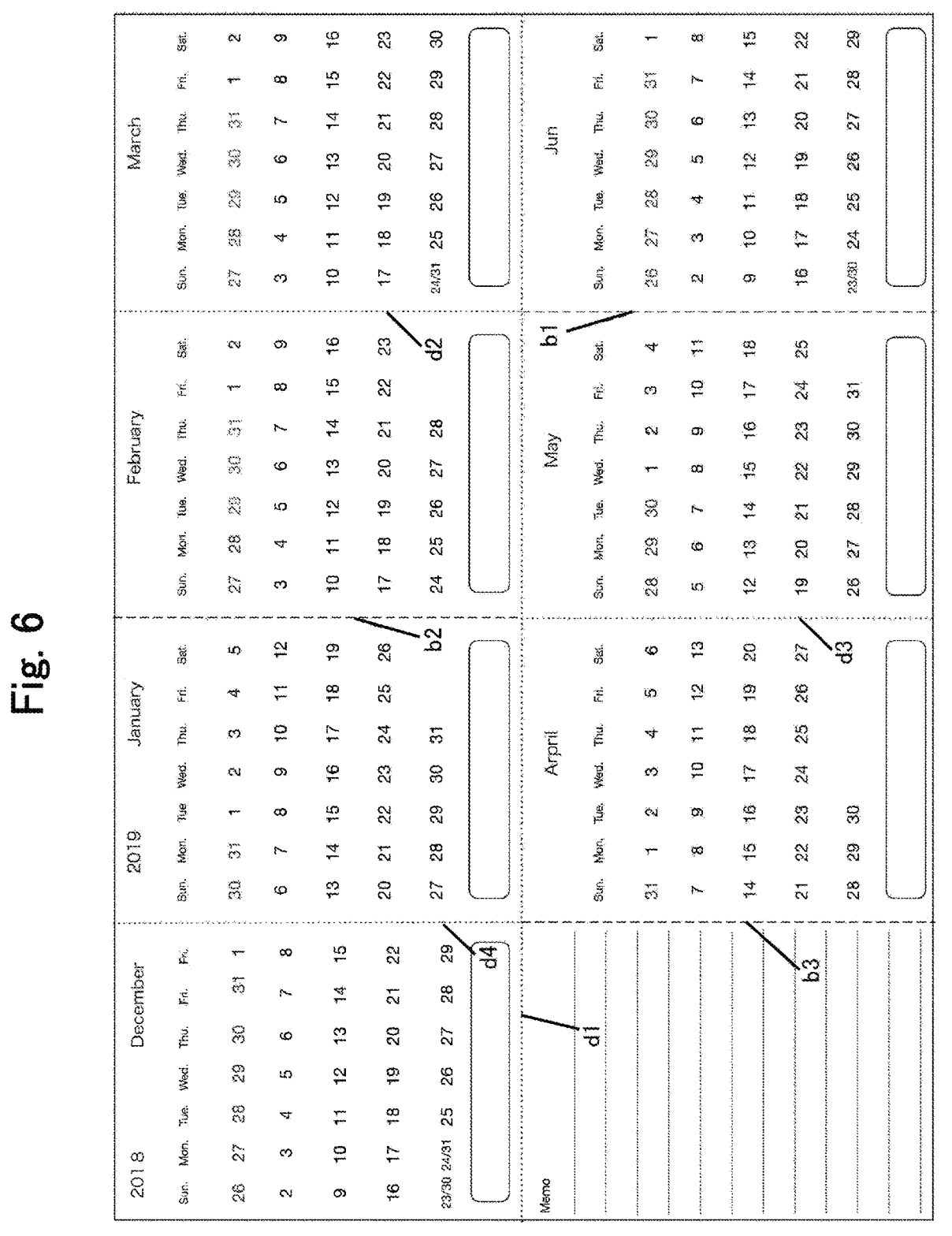
Figure 7:
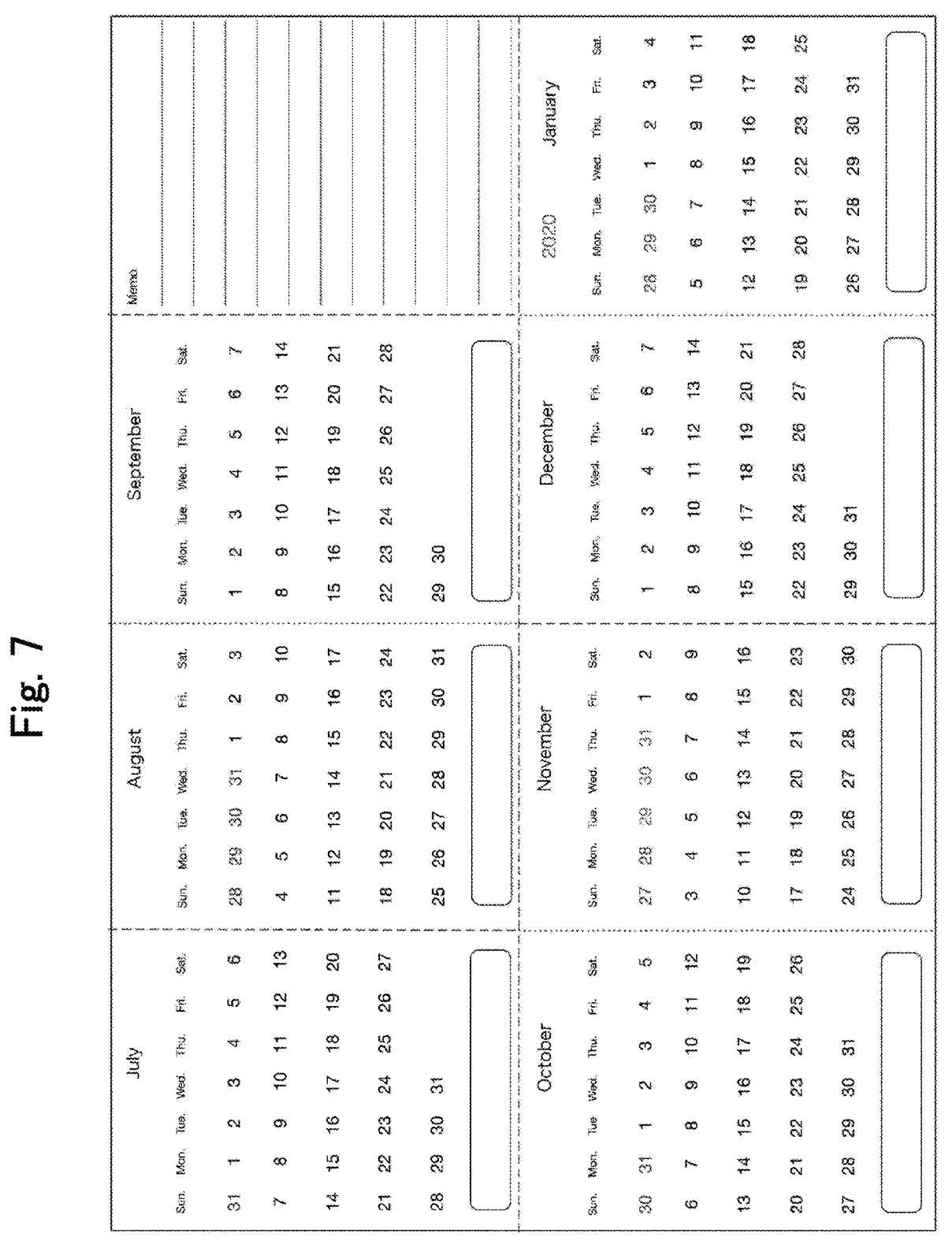

FIG. 6 and FIG. 7 are expanded views having a relationship of front-and-back to each other and showing a portable calendar 2 in accordance with an embodiment 2 of the present invention. In the expanded views, dotted lines show the mountain fold, and broken lines show the valley fold. These dotted lines and broken lines are not printed in the real product. Like the embodiment 1, the portable calendar 2 is made of a quality paper in format A2 on which a calendar system is printed and which is folded in eight. However, the way of folding the A2 sheet and the layout of the printed calendar style are different from those of the portable calendar 1 of the embodiment 1.

The eight-folded state is made from the fully-opened state as illustrated in FIG. 6 and FIG. 7, first, by mountain folding the paper along dotted line d1 to form a two-folded state. Namely, the A2 quality paper is folded in the longitudinal direction. Next, the long narrow two-folded paper is folded like bellows into four, i.e., into eight as seen from the fully-opened state. Namely, the two-folded paper is mountain folded along dotted lines d2, d3 and d4, and at the same time valley folded along broken line b1, b2 and b3.

Furthermore, unlike the embodiment 1, there is no frame line separating the dates of the calendar, and each month is arranged in a vertically long area. When the portable calendar 2 is fully expanded, it is possible to take a look at six months of the calendar in the A2 sheet oriented sideways.

Also for the portable calendar 2 of this embodiment, the utility program described in the embodiment 1 can be used. This utility program detects the orientation of the image as taken, and determines which of the portable calendar 1 of the embodiment 1 and the portable calendar 2 of the embodiment 2 corresponds to the taken image to store one year's schedule and memoranda as separate monthly files.

Embodiment 3

Figure 8:
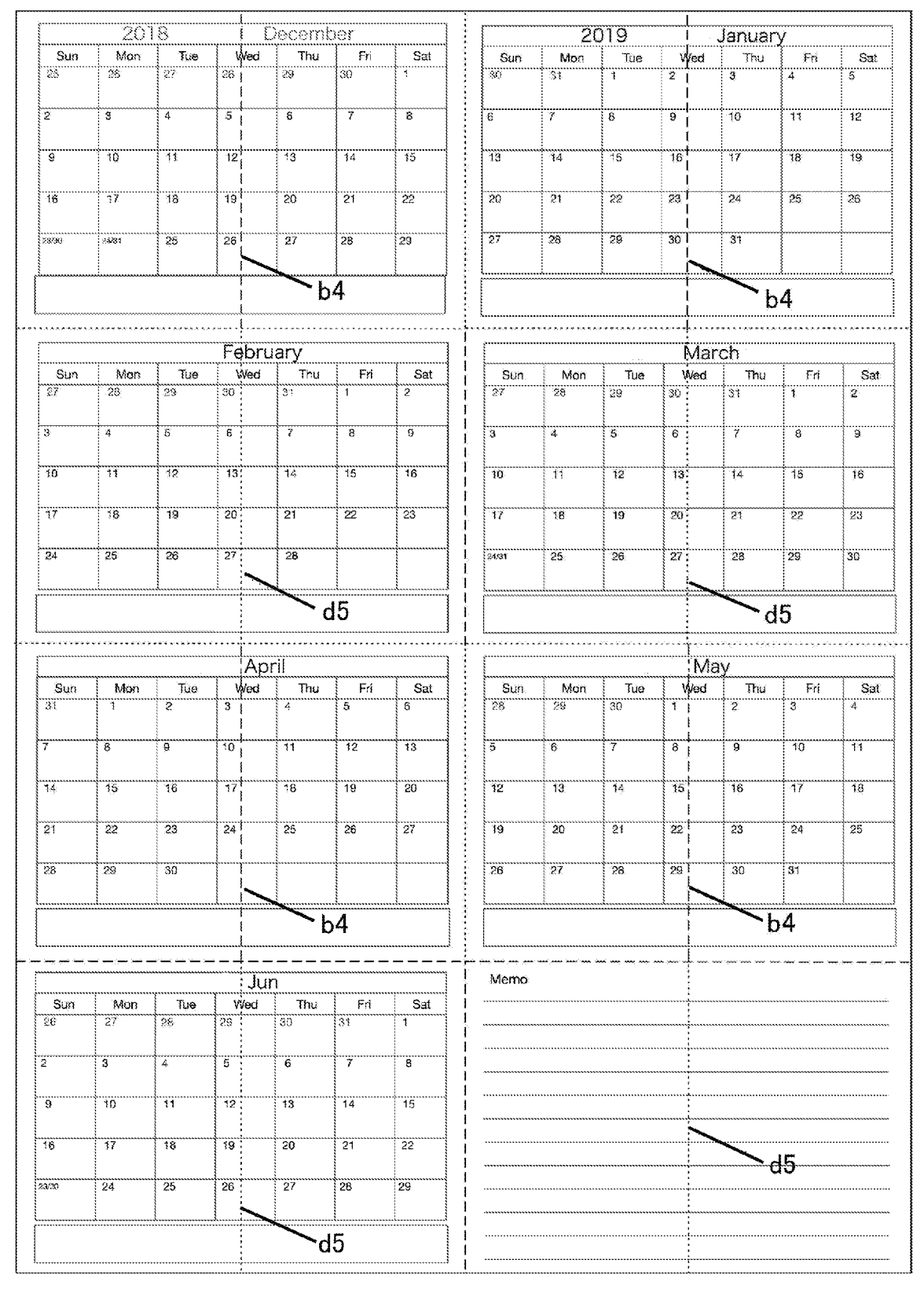
Figure 9:
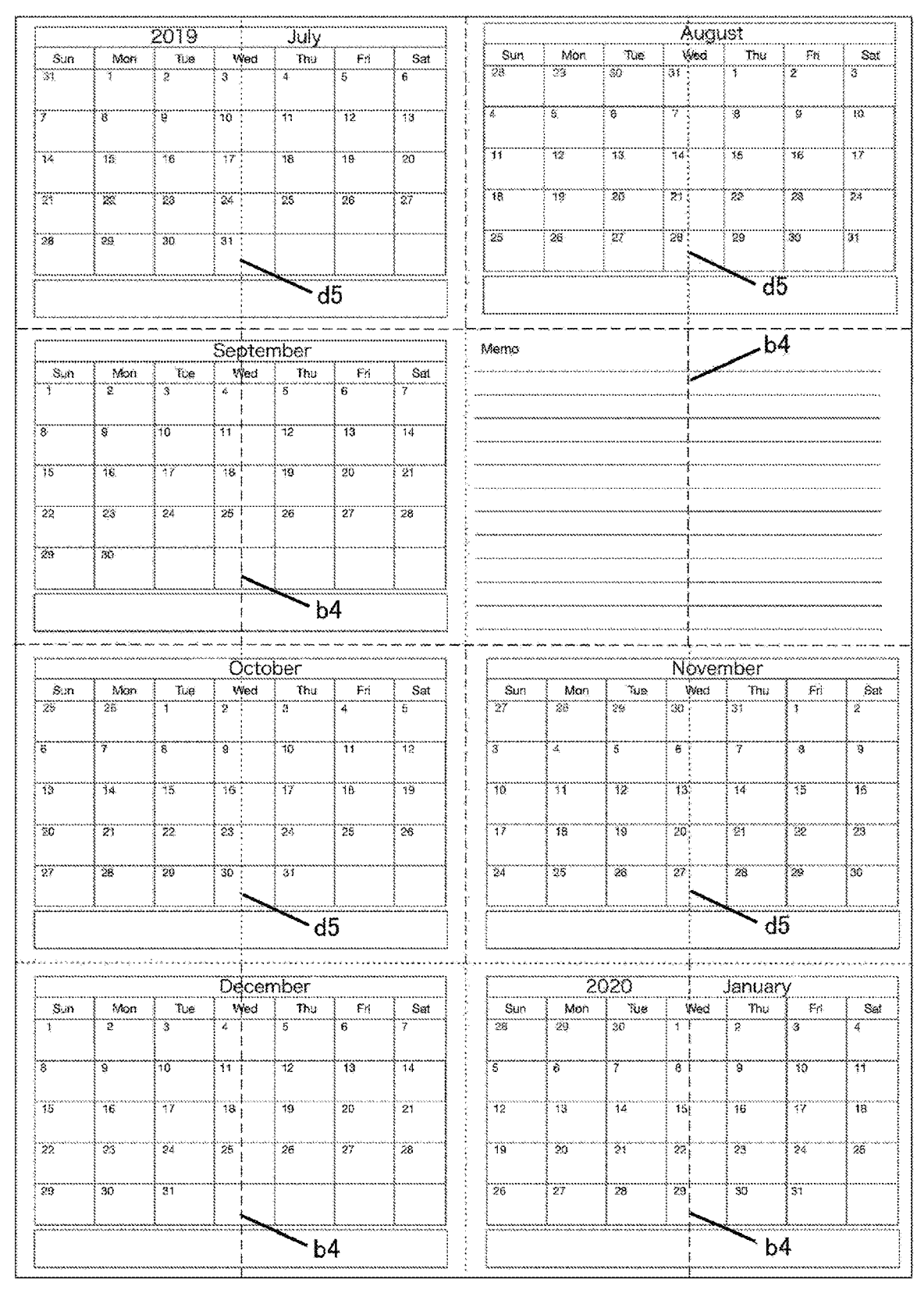

FIG. 8 and FIG. 9 are expanded views having a relationship of front-and-back to each other and showing a portable calendar 3 in accordance with an embodiment 3 of the present invention. In the expanded views, dotted lines show the mountain fold, and broken lines show the valley fold. These dotted lines and broken lines are not printed in the real product. The portable calendar 3 of the embodiment 3 is approximately same as the portable calendar 1 of the embodiment 1 but differs only in that the state as illustrated in FIG. 1 is further folded in two, i.e., in sixteen as seen from the fully-opened state.

Figure 10:
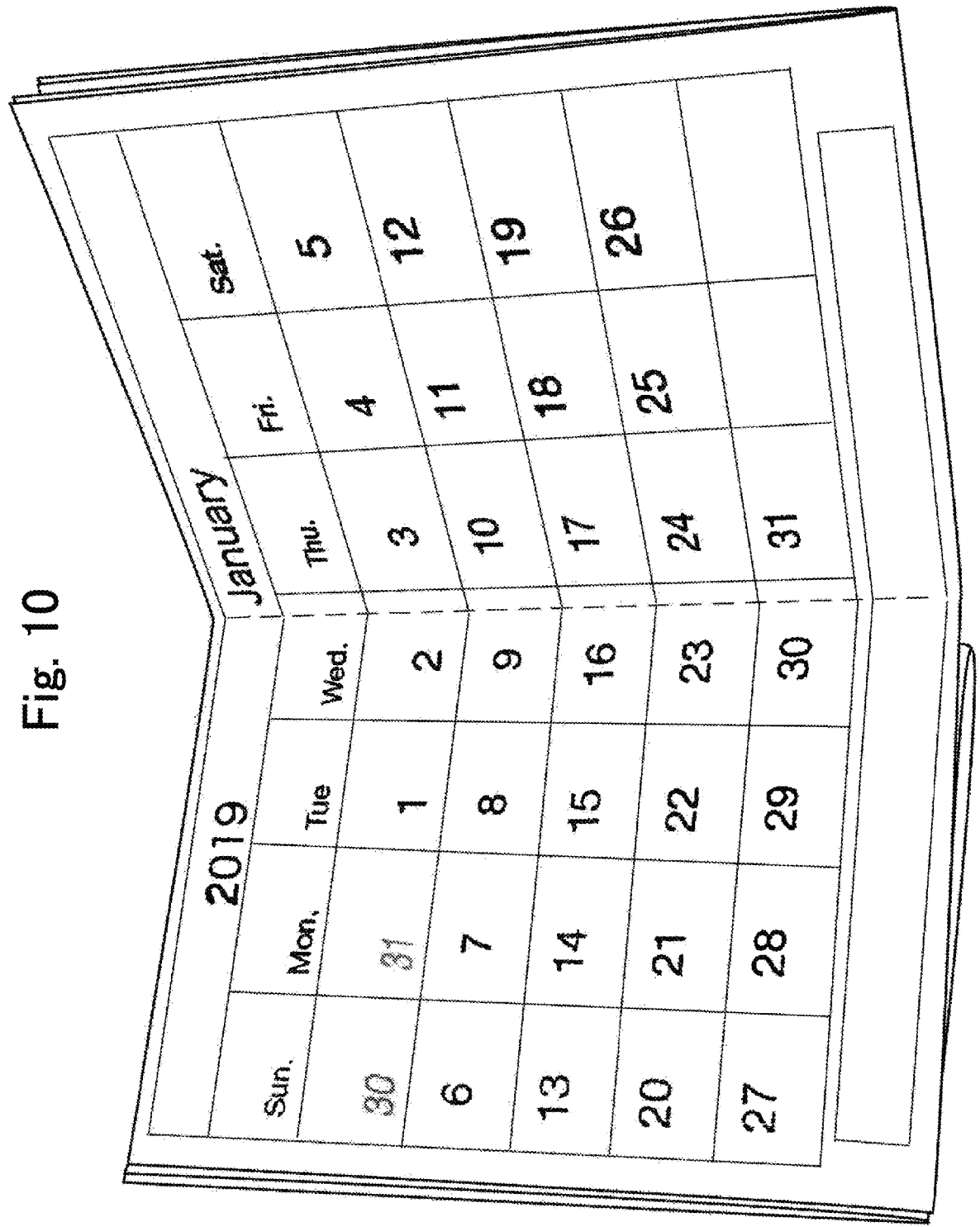
FIG. 10 is a schematic diagram for showing the portable calendar 3 opened to display right and left spread pages of January in accordance with the embodiment 3 of the present invention.

In this embodiment 3, as illustrated in FIG. 10, January can be viewed in right and left spread pages. Thus, the size of the folded state can be reduced, and the calendar becomes more compact and suitable for portable use. Alternatively, it is possible to increase the calendar area of one month and the space for writing memoranda by making use of quality paper of B2 or A1 instead of A2. In the case where an A1 quality paper is used, the size of the fully folded state is A5.

Embodiment 4

Figure 11:
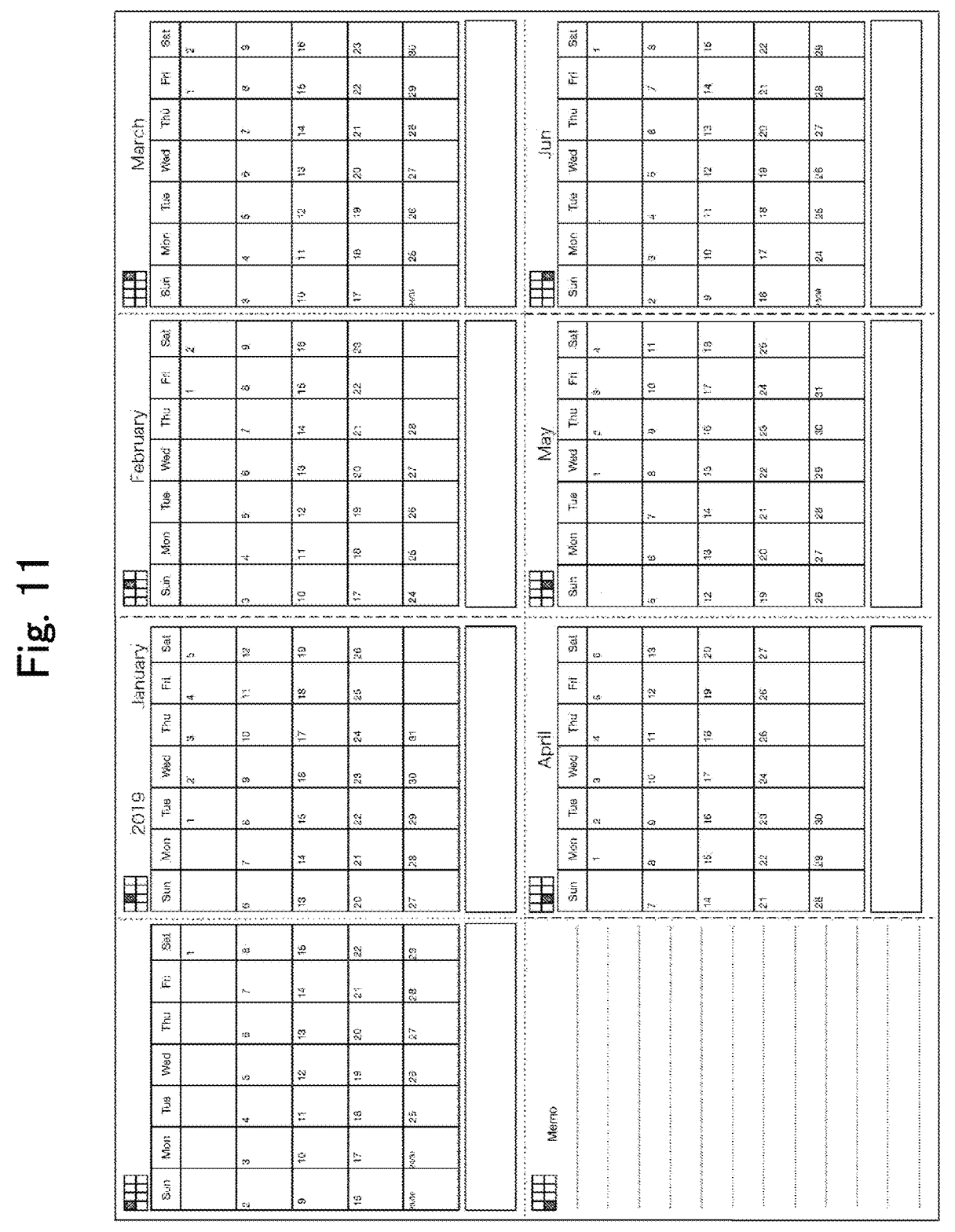
Figure 12:
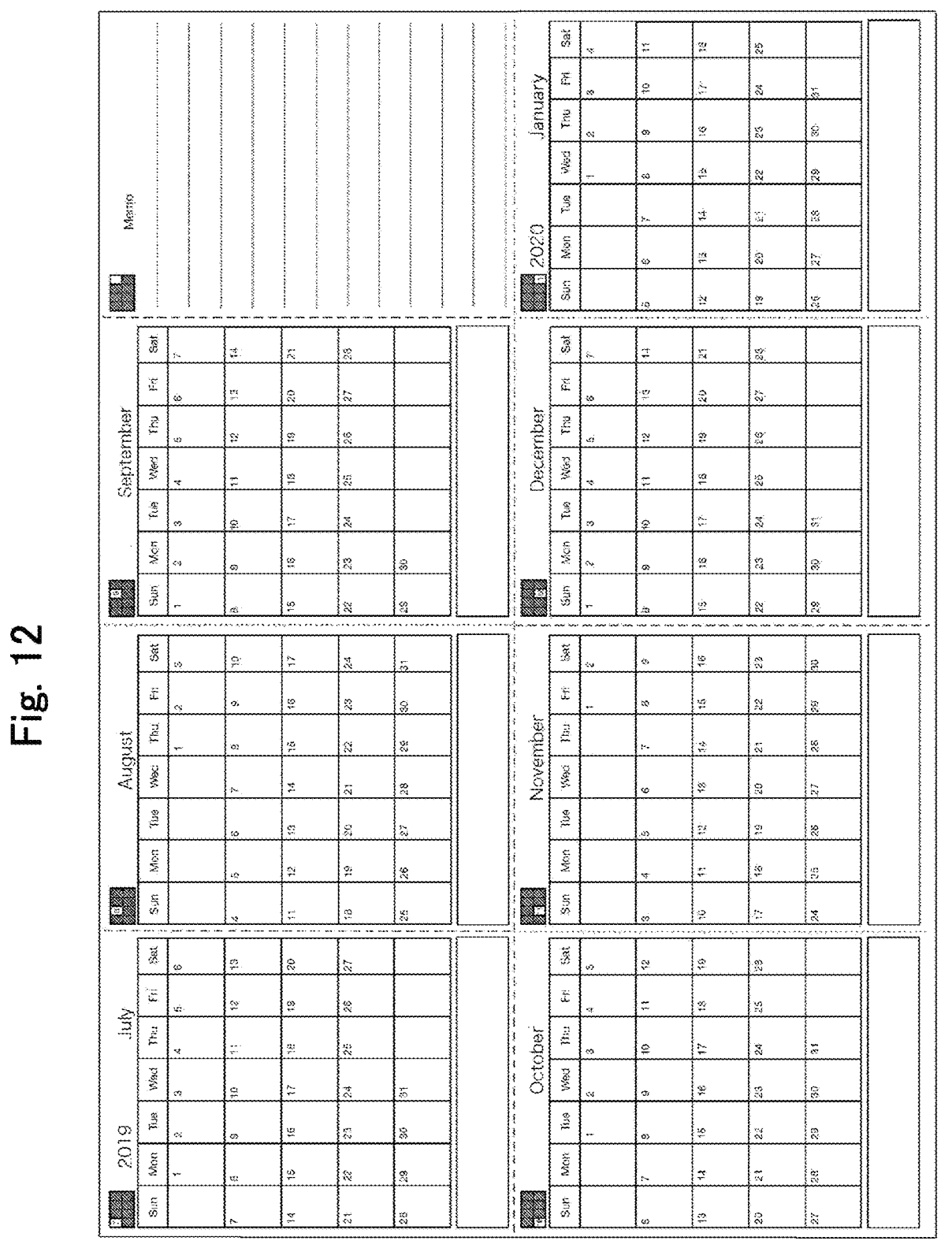

FIG. 11 and FIG. 12 are expanded views having a relationship of front-and-back to each other and showing a portable calendar in accordance with an embodiment 4 of the present invention. In the expanded views, dotted lines show the mountain fold, and broken lines show the valley fold. These dotted lines and broken lines are not printed in the real product. The portable calendar 4 of the embodiment 4 differs from the above embodiments in that a rectangular icon is printed in the upper left corner of the area of each month. This icon is divided into eight sections arranged in two columns and four rows.

In the case of icons for use in the embodiment 4 of the present invention, as illustrated in FIG. 11, the position of each month in the expanded view (for example, the entirety of the fully-expanded A2 quality paper) is represented by the high density area in the icon of each month. In other words, the position of each month in the entirety of the expanded view corresponds to the position of the high density area in the entirety of the icon. For example, the area of March is located in the upper right corner of the entirety of the expanded view. Thereby, the upper right area of the rectangular icon printed in the upper left corner of the area of March is painted in black. Furthermore, in the area of the rectangular icon painted in black according to this embodiment, the numeral of that month (e.g., "1") is described in white. However, no numeral is described in the icon printed in the upper left corner of the lower left corner memorandum space.

On the other hand, in FIG. 12, the position of each month in the expanded view (for example, the entirety of the fully-expanded A2 quality paper) is represented by a low density area in an icon. In other words, the position of each month in the entirety of the expanded view corresponds to the position of the low density area in the entirety of the icon. For example, the area of July is located in the upper left corner of the entirety of the expanded view. Thereby, the rectangular icon printed in the upper left corner of the area of July is painted in black except for the upper left area thereof. Furthermore, in the unpainted white area of the rectangular icon according to this embodiment, the numeral of that month (e. g., "7") is described. However, no numeral is described in the icon printed in the upper left corner of the upper right corner memorandum space.

Also in this embodiment, the folding lines, i.e., the mountain folding lines and the valley folding lines as illustrated in FIG. 11 and FIG. 12 correspond to an initially suggested way of folding. However, in practice, any folding way is possible in accordance with the actual situation. The paper can be freely folded to display a necessary month(s) in the front side. Accordingly, a plurality of months of the calendar can be viewed, and a memo or the like can be written through months. By the upper left icon, it is possible to know in which position the month exposed in the front side after folding is located in the expanded view.

Embodiment 5

Figure 13:
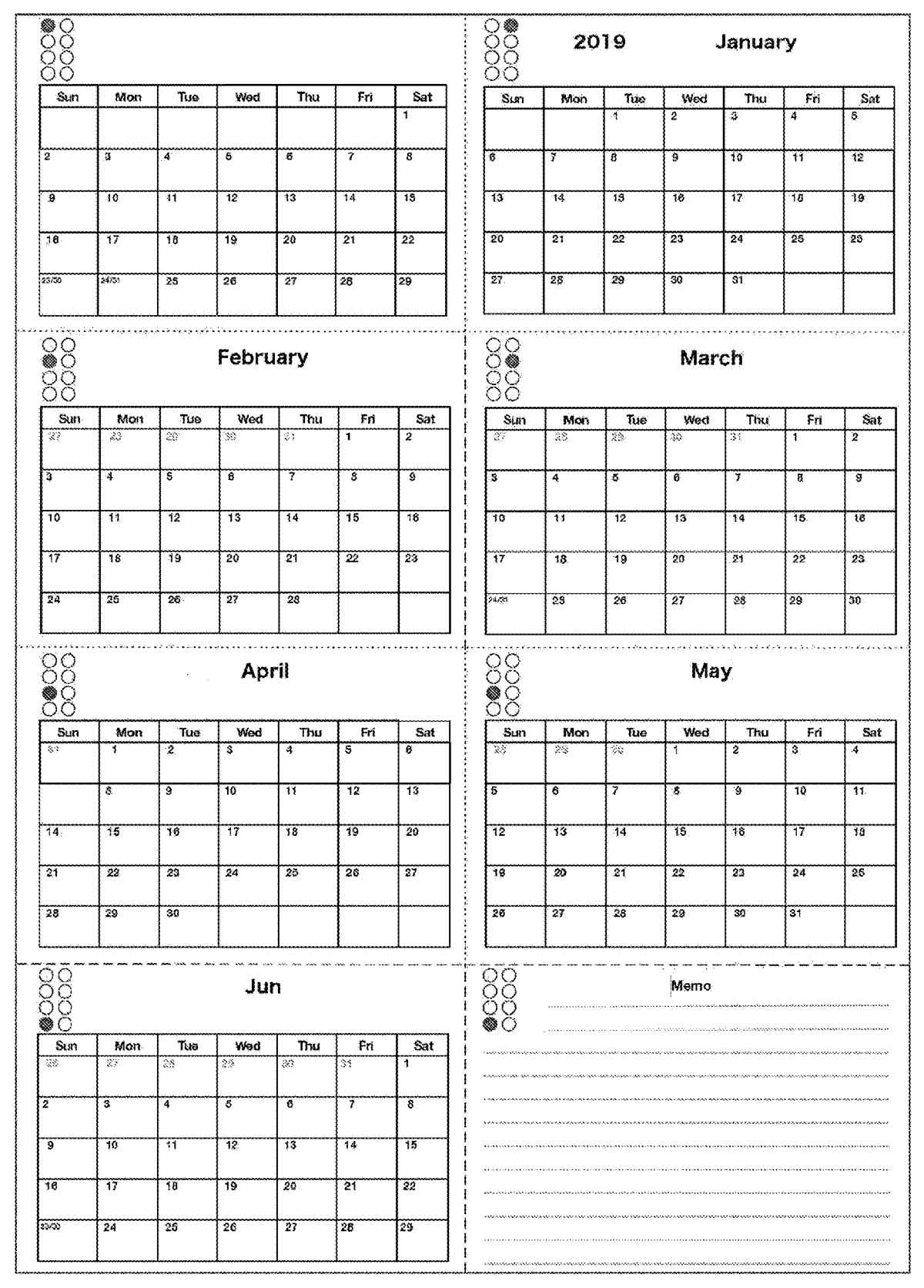

FIG. 13 and FIG. 14 are expanded views having a relationship of front-and-back to each other and showing a portable calendar 5 in accordance with an embodiment 5 of the present invention. Also, in the expanded views, dotted lines show the mountain fold, and broken lines show the valley fold. These dotted lines and broken lines are not printed in the real product. The portable calendar of the embodiment 5 differs from the embodiment 1 in that an icon is printed in the upper left corner of the area of each month.

The icon used in this embodiment consists of eight circular marks. Then, the position of each month in the expanded view (for example, the entirety of the fully-expanded A2 quality paper) is represented by a high density circular mark of the icon in FIG. 13. In other words, the position of each month in the entirety of the expanded view corresponds to the position of the high density circular mark in the entirety of the icon. For example, the area of January is located in the upper right corner of the entirety of the expanded view. Thereby, the upper right circular mark of the rectangular icon printed in the upper left corner of the area of January is printed as a high density circular mark (black circle). The other circular marks are low density circular marks (white circles).

On the other hand, in FIG. 14, the position of each month in the expanded view (for example, the entirety of the fully-expanded A2 quality paper) is represented by a low density circular mark of the icon. In other words, the position of each month in the entirety of the expanded view corresponds to the position of the low density circular mark in the entirety of the icon. For example, the area of July is located in the upper left corner of the entirety of the expanded view. Thereby, the upper left circular mark of the rectangular icon printed in the upper left corner of the area of July is printed as a low density circular mark (white circle). The other circular marks are high density circular marks (black circles).

Embodiment 6

The technical idea of the present invention as explained above with reference to the portable calendars can be applied also to other paper stationery. The following embodiments (embodiment 6 through embodiment 13) relates to application to notebooks. The notebook comprises a rectangular paper sheet folded in eight or sixteen in order that the rectangular paper sheet is divided into four equal parts along one side of the rectangular paper sheet and divided into two or four equal parts along the other side of the rectangular paper sheet. Each of front and back sides of the rectangular paper sheet is equally partitioned by folding lines into areas each of which serves as a page in which is printed a regular pattern vertically or horizontally arranged to aid in writing characters and the like in an aligned fashion.

In addition, an identifier is printed on each page in order to identify the position of the each page in the entirety of the rectangular paper sheet. The identifier is, for example, an alphabetic character, a numeral, a color or a combination thereof. Alternatively, in other embodiments, the identifier is an icon printed on one corner of each page. This icon represents the entirety of a rectangular sheet as a reduced area in which the position corresponding to the page is visually differentiated in order that it can be discerned.

The drawings as referred to in the following description are black-and-white. However, in some embodiments, coloring is important. In such a case, the coloring will be explained each time when necessary. Also, the size of the embodiments of the notebooks as described below is A2 in a fully expanded state. However, the present invention is not limited thereto. For example, the size may be A1, B2 or A3 in a fully expanded state. Also, while horizontal ruled lines are used in the following examples, a variety of patterns can be used instead, e.g., vertical lines, a regular grid, equal interval dots or the like which can be used for aiding in writing characters and the like in an aligned fashion.

Figure 15:
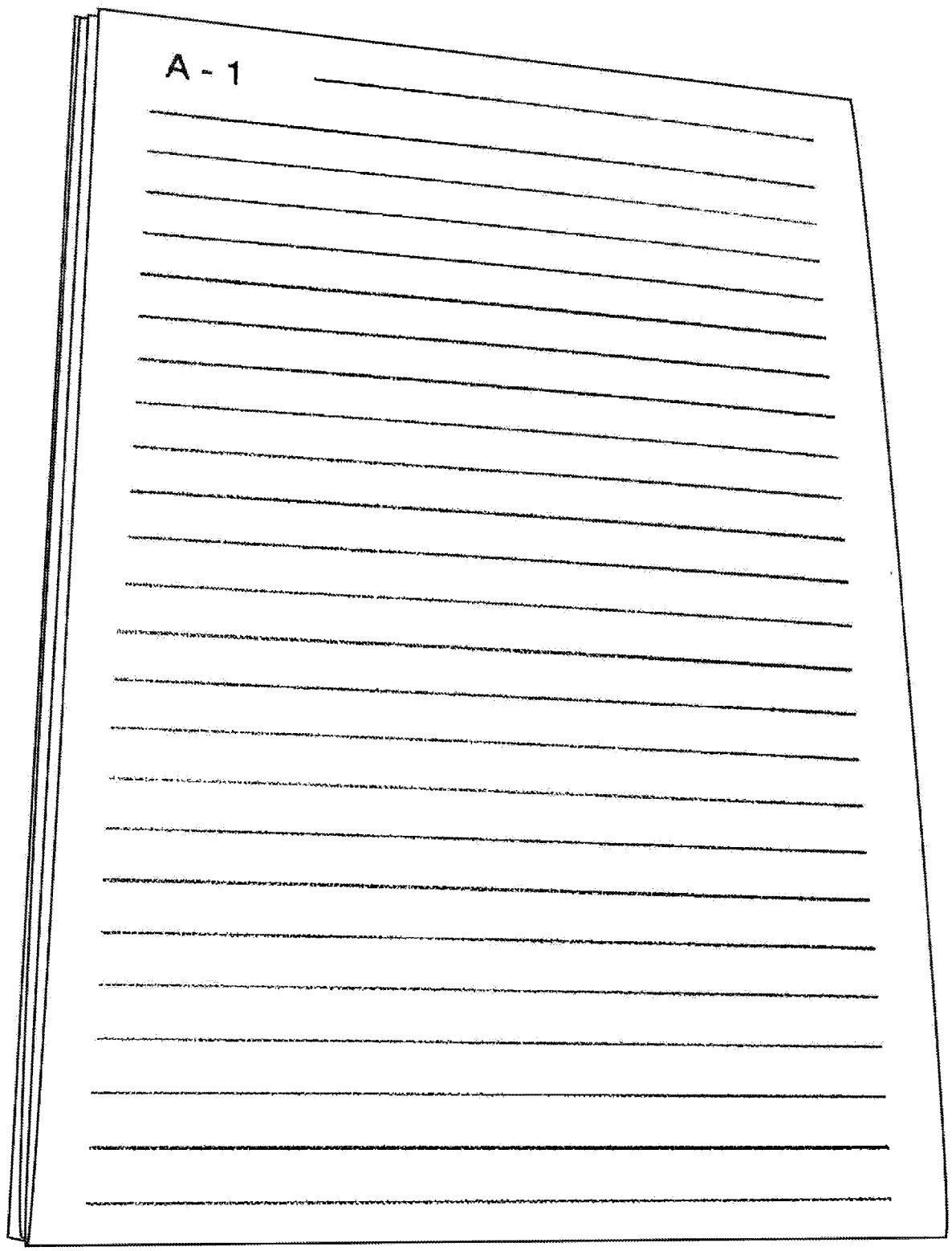
FIG. 15 is a perspective view for showing a notebook 11 in accordance with an embodiment 6 of the present invention.

FIG. 15 is a perspective view for showing a notebook 11 in accordance with an embodiment 6 of the present invention. This notebook 11 is made of a quality paper in format A2 which is folded in eight. Also, FIG. 16 and FIG. 17 are expanded views of the notebook 11 shown in FIG. 15 and having a relationship of front-and-back to each other.

Figure 16:
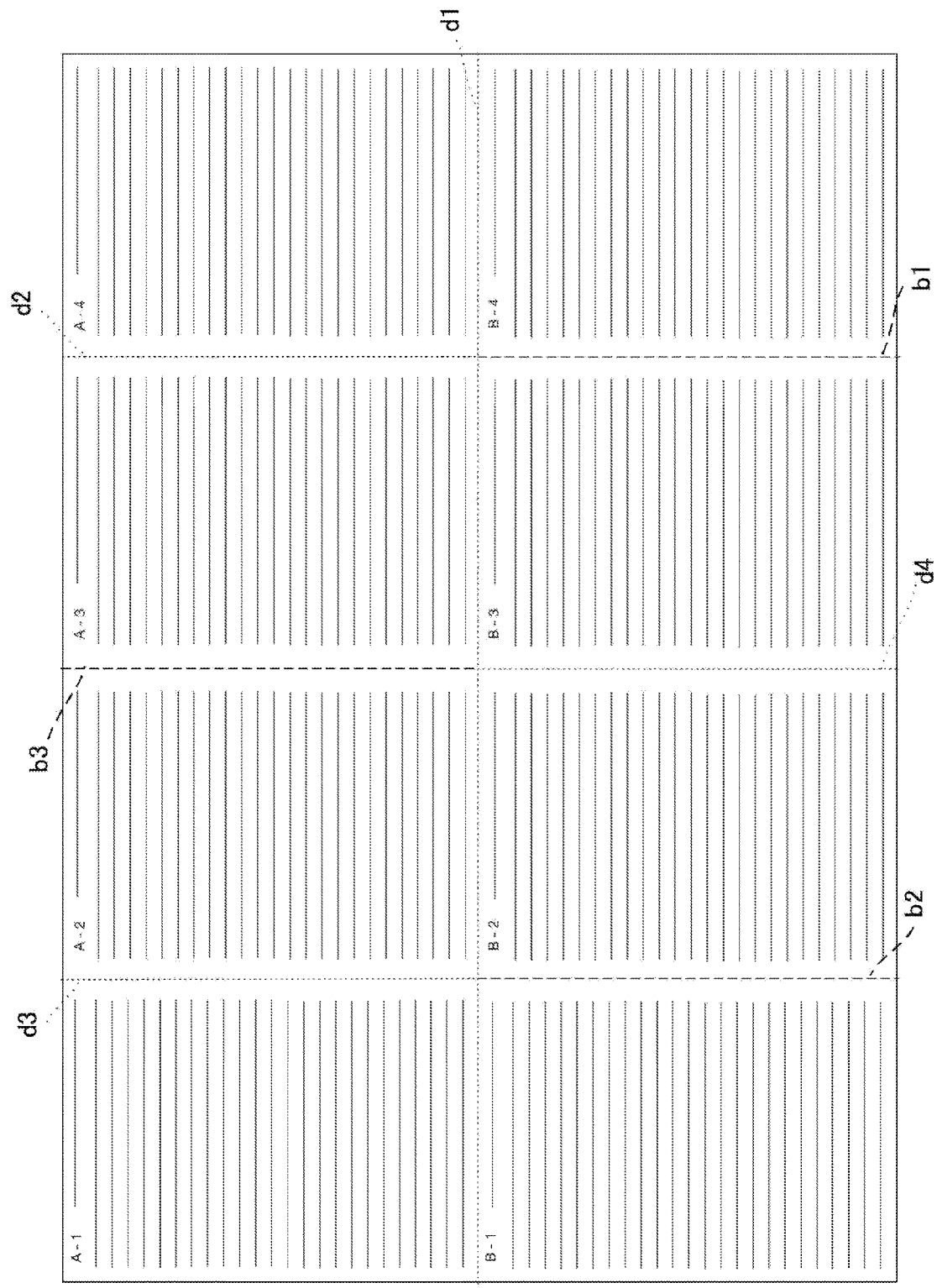
FIG. 16 is an expanded view for showing the notebook 11 in accordance with the embodiment 6 of the present invention and showing eight pages printed in the front side.
Figure 17:
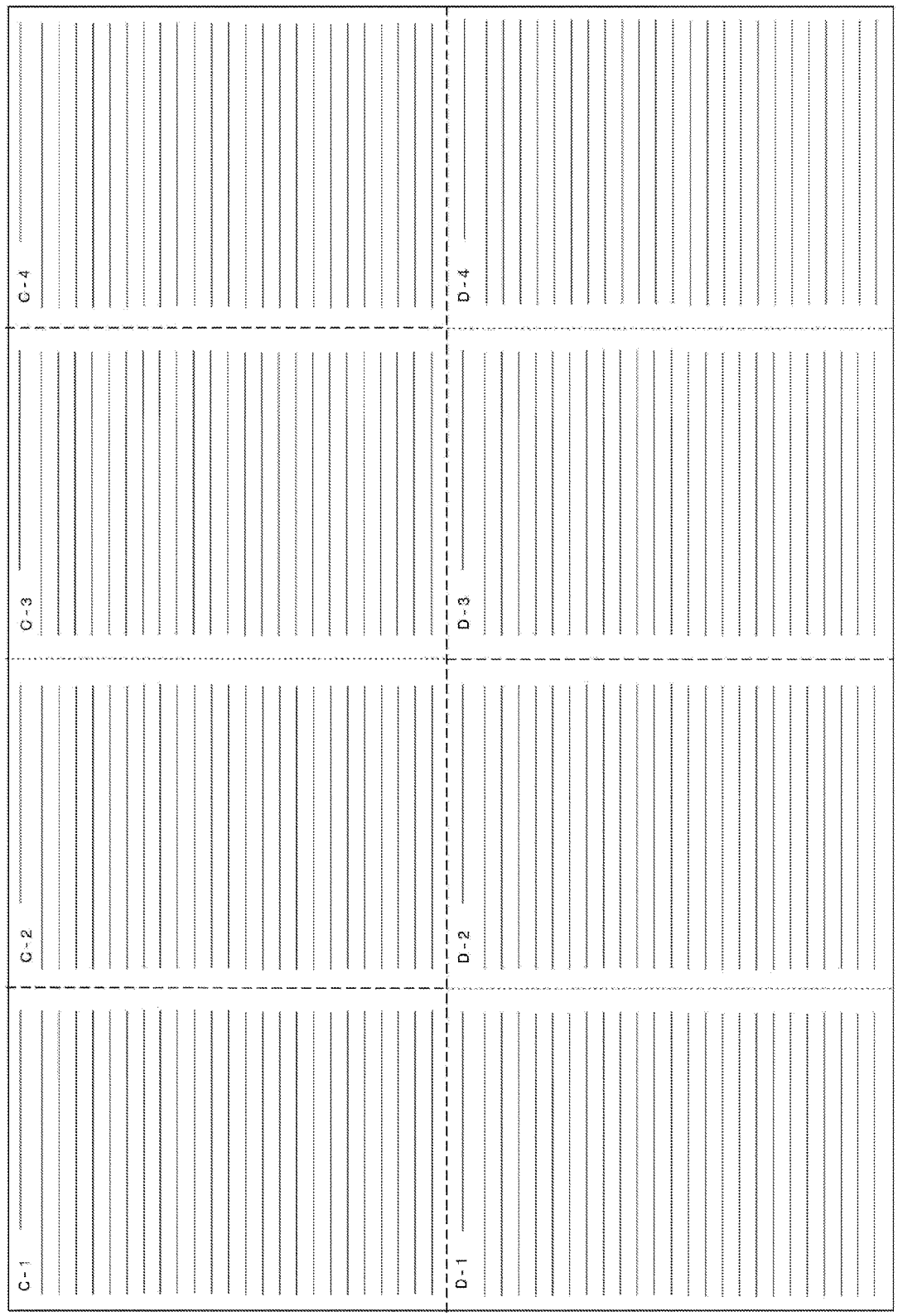
FIG. 17 is an expanded view for showing the notebook 11 in accordance with the embodiment 6 of the present invention and showing eight pages printed in the back side.

In the expanded views of FIG. 16 and FIG. 17, dotted lines show the mountain fold, and broken lines show the valley fold. These dotted lines and broken lines are not printed in the real product. The eight-folded state is made from the fully-opened state as illustrated in FIG. 16 and FIG. 17, first, by mountain folding the paper along dotted line d1 to form a two-folded state. Namely, the A2 quality paper is folded in the longitudinal direction. Next, the long narrow two-folded paper is folded like bellows into four, i.e., into eight as seen from the fully-opened state. Namely, the two-folded paper is mountain folded along dotted lines d2, d3 and d4, and at the same time valley folded along broken line b1, b2 and b3.

As illustrated in FIG. 16 and FIG. 17, in the fully-opened state, this notebook consists of eight areas (called "page" herein) partitioned by the folding lines. There are sixteen pages in both sides. Ruled lines are printed on each page on whose upper left corner an identification mark (identifier) is printed. Namely, identification marks are printed as A-1, A-2, A-3, and A-4 on the upper row of the front side from the left, B-1, B-2, B-3, and B-4 on the lower row of the front side from the left, C-1, C-2, C-3, and C-4 on the upper row of the back side from the left, D-1, D-2, D-3 and D-4 on the lower row of the back side from the left.

This is sold as a product in a state displaying page A-1 (page A-4 on the opposite side) as illustrated in FIG. 15 (the paper is folded in eight into the smallest state). It is possible to successively open other pages from the folded state in order to display, for example, page A-2 and page A-3, then page A-1, page A-2 and page A-3, and so forth.

The folding lines, i.e., the mountain folding lines and the valley folding lines as illustrated in FIG. 16 and FIG. 17 correspond to an initially suggested way of folding. However, in practice, any folding way is possible in accordance with the actual situation. The paper can be freely folded to display an necessary page(s) in the front side. On the other hand, it can sometimes not be known on what page writing is performed (what page is the front page). However, in the case where an identification mark is printed on each page as described above, writing can be performed, while being always conscious of the position of the currently front page, by referring to this identification mark.

It is sometimes desired to store the items written on the notebook after use for the purpose of confirmation in the future or the like. In such a case, the notebook itself may be stored. However, it is significantly convenient for handling if the written items can be saved as digital data.

Conventionally, the written items are saved by scanning or taking an image of each page. In this case, even if an image is taken from each double-page spread, photographing has to be repeated eight times for sixteen pages or sixteen times for 32 pages, and the image has to be saved by giving a name every time. This process takes time and therefore is substantially cumbersome. In the case of the notebook 11 according to the present invention, this process can be done in one step by the use of an application program for smartphone. In what follows, this application program will be explained.

In recent years, there are many smartphones having a camera with a resolution of over twenty million pixels. The image taken by such a camera can be clearly displayed up to details even expanded. Accordingly, when an image is taken of the entirety of the notebook 11 which is fully opened into the state of the A2 size, even small written contents can be clearly viewed by expansion.

After invoking the application program, the user pushes the shutter of the camera of the smartphone with the timing when the entirety of the A2 size paper is captured. The application program then analyzes the taken image, and detects the position of each page. For example, the application program identifies areas partitioned with dotted lines and broken lines as illustrated in FIG. 16 and FIG. 17. However, since these dotted lines and broken lines are not printed in the real product, beltlike blank spaces (along the folding lines) are identified. Each page is recognized as an area surrounded by the blank spaces. Alternatively, the position of each page can be detected by recognizing the identification mark printed on the each page and determining the arrangement of the pages with reference to the positions of the identification marks.

The A2 image is then divided into eight equal parts which are stored as data items (files). At this time, the correspondence of the files to the pages is determined by character recognition of the identification marks. For example, if stored on Jan. 1, 2019, page A-1 is stored with a file name of 20190101A1.jpg for identification. Accordingly, it is possible to store the items written on sixteen pages as a separate file for each page respectively only by opening the notebook into the state of the A2 size and taking entire images of front and back sides thereof.

In summary, this application program is a page imaging segmentation application installed in a smartphone and used for a notebook comprising a rectangular paper sheet folded in eight or sixteen in order that the rectangular paper sheet is divided into four equal parts along one side of the rectangular paper sheet and divided into two or four equal parts along the other side of the rectangular paper sheet, wherein each of front and back sides of the rectangular paper sheet is equally partitioned by folding lines into areas each of which serves as a page in which is printed a regular pattern vertically or horizontally arranged to aid in writing characters and the like in an aligned fashion. The page imaging segmentation application causes the smartphone to function as an image acquisition means for taking an image of the entirety of the rectangular paper sheet and acquiring the taken image as an entire image, an image analysis separation means for analyzing the entire image, separating the entire image into an image of each page and acquiring the separated image for each page, and a separated image storage means for storing each separated image with a name assigned to distinguish the separated images from each other.

The separated images stored by this application program are displayed, for example, by selecting either of the following orders. The first order is a line order in which are displayed page A-1, page A-2, page A-3, page A-4, page B-1, page B-2, page B-3, page B-4, . . . page D-1, page D-2, page D-3, D-4 page in the case shown in FIG. 16. The other order is a column order in which are displayed page A-1, page B-1, page C-1, D-1 page, page A-2, page B-2, page C-2, page D-2, . . . , page C-4, page D-4 in the case shown in FIG. 16.

Alternatively, the displayed page can be successively changed in the vertical and horizontal directions by vertical and horizontal swipe operation, and in the diagonal directions by diagonal swipe operation.

The storage destination may be a local storage of a smartphone or an online storage. For example, the storing operation may be performed in cooperation with a cloud service (EverNote, OneNote or GoogleDrive) or the like.

Embodiment 7

Figure 18:
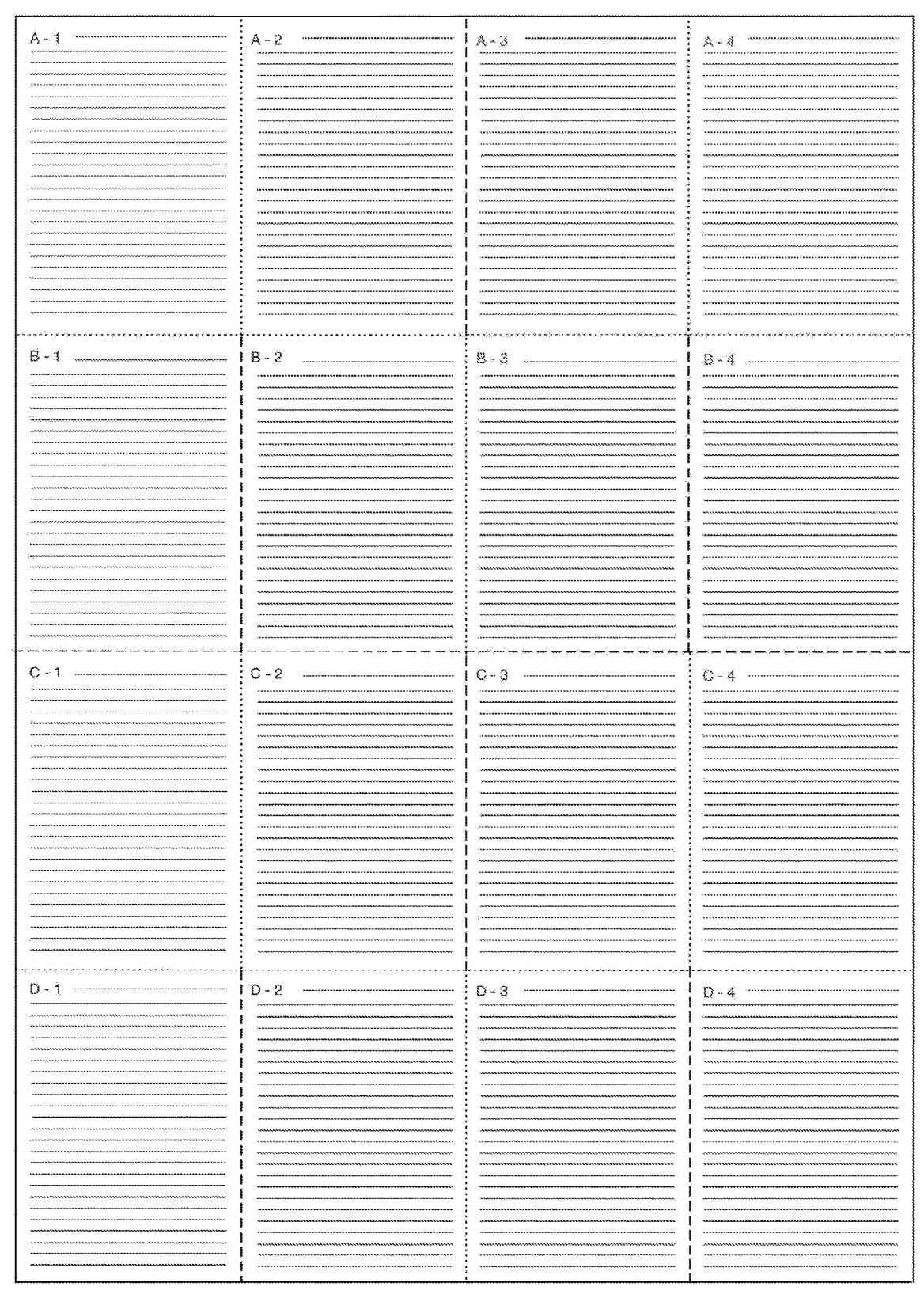
Figure 19:
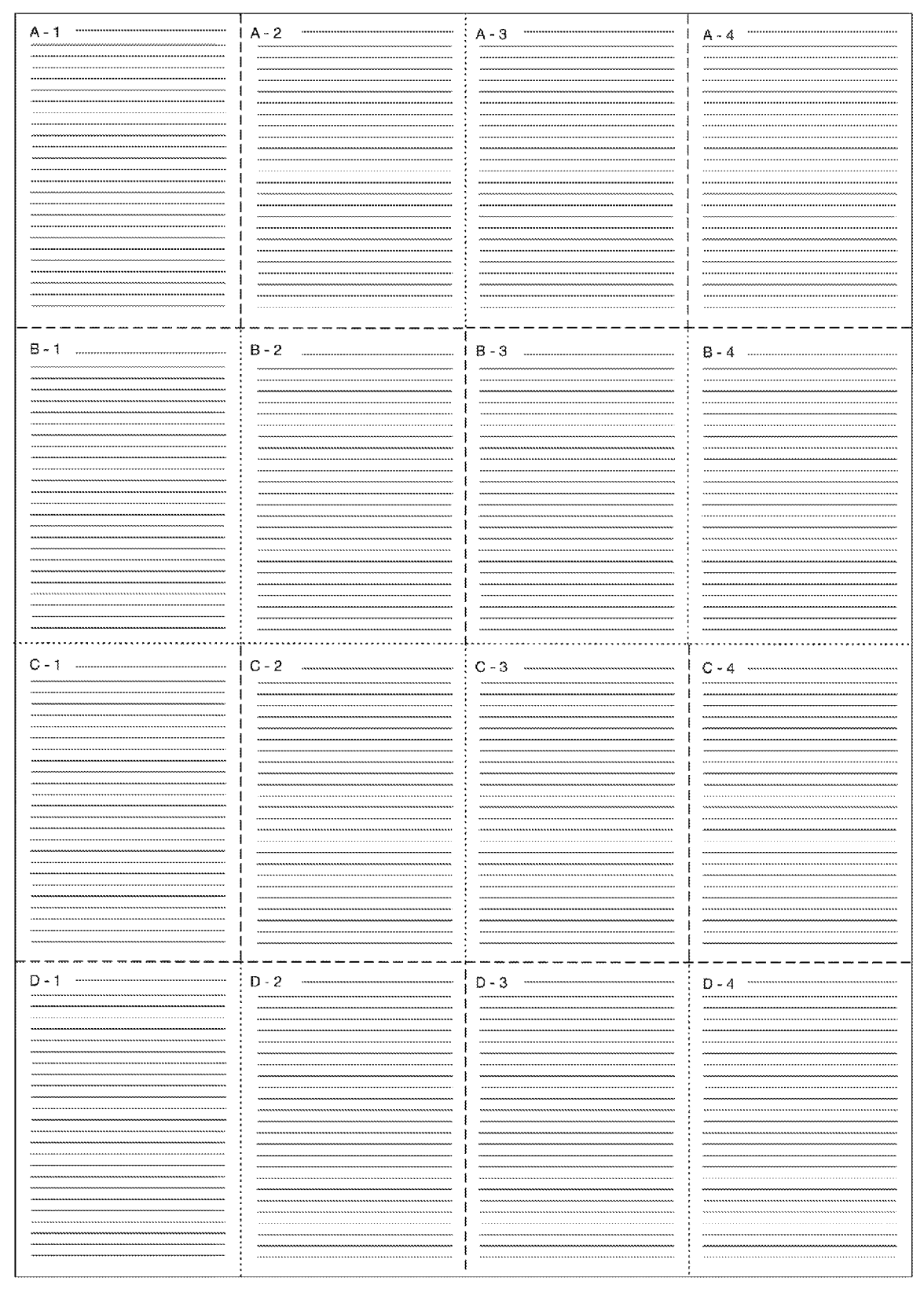

FIG. 18 and FIG. 19 are expanded views of the notebook 12 in accordance with the embodiment 7 of the present invention and having a relationship of front-and-back to each other. In the expanded views, dotted lines show the mountain fold, and broken lines show the valley fold. These dotted lines and broken lines are not printed in the real product. While the notebook 11 according to the embodiment 6 is made of a quality paper in format A2 which is folded in eight, the notebook 12 according to the embodiment 7 is further folded in two, i.e., in sixteen as seen from the fully-opened state. Incidentally, a quality paper in format A1 may be used in place of the quality paper in format A2. In this case, the size of one page becomes the same as that of the notebook 11 according to the embodiment 6.

As illustrated in FIG. 18 and FIG. 19, this notebook consists of sixteen pages partitioned by folding lines in the fully-opened state. There are 32 pages in both sides. Ruled lines are printed on each page on whose upper left corner an identification mark is printed. Namely, identification marks are printed as A-1, A-2, A-3, and A-4 on the uppermost row of the front side from the left, B-1, B-2, B-3, and B-4 on the second row of the front side from the left, C-1, C-2, C-3, and C-4 on the third row of the front side from the left, D-1, D-2, D-3 and D-4 on the lowermost row of the front side from the left. As illustrated in FIG. 19, the same identification marks are printed also on the back side.

FIG. 18 and FIG. 19 appear identical to each other in the black-and-white drawings except that the dotted lines and the broken lines replace each other. However, in the actual product, the identification marks are printed in blue on the front side, and the identification marks are printed in red on the back side. A user can thereby distinguish the front and back sides by the color of the identification marks.

Embodiment 8

Figure 20:
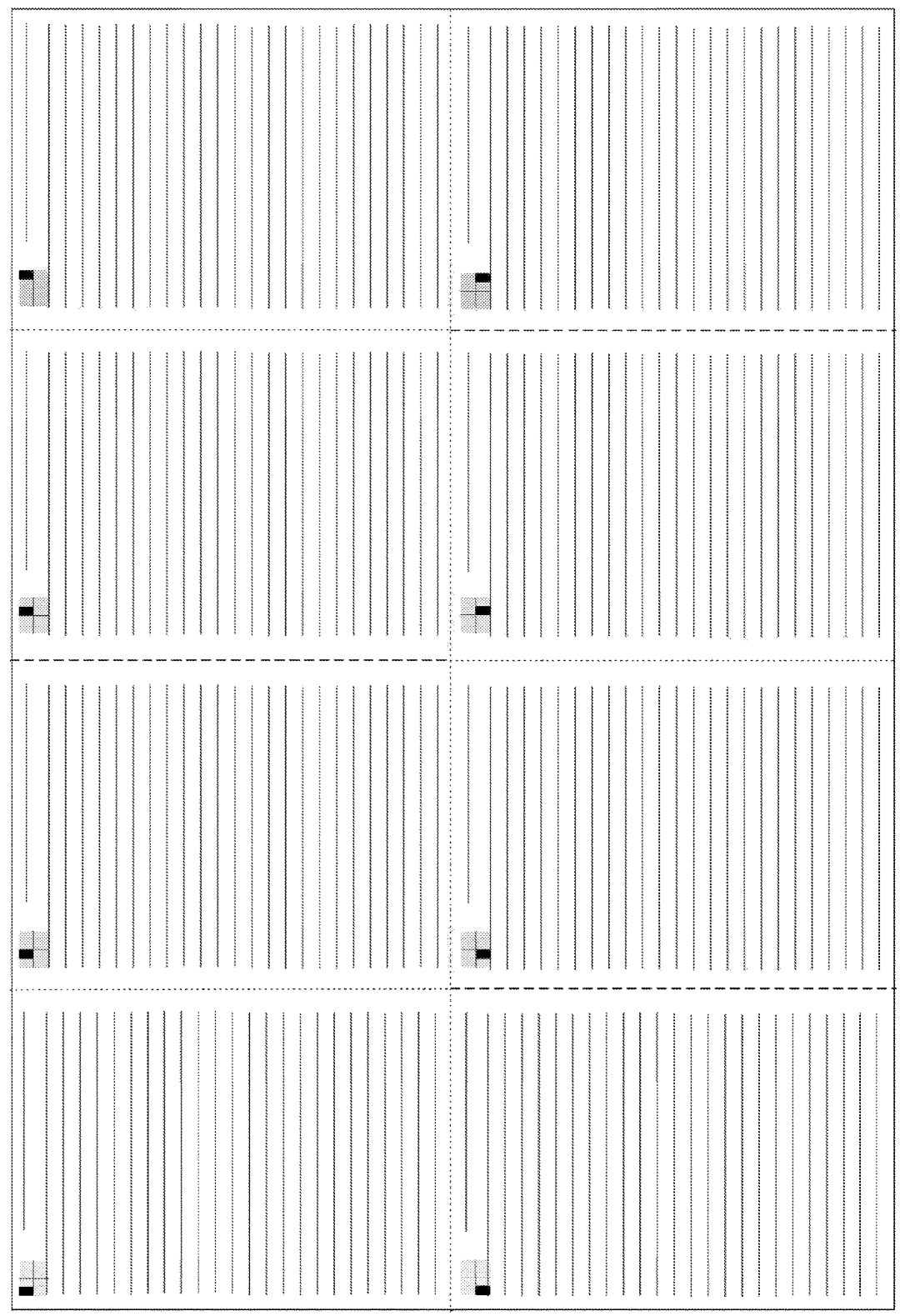
FIG. 20 is an expanded view for showing a notebook 13 in accordance with an embodiment 8 of the present invention and showing eight pages printed in the front side.
Figure 21:
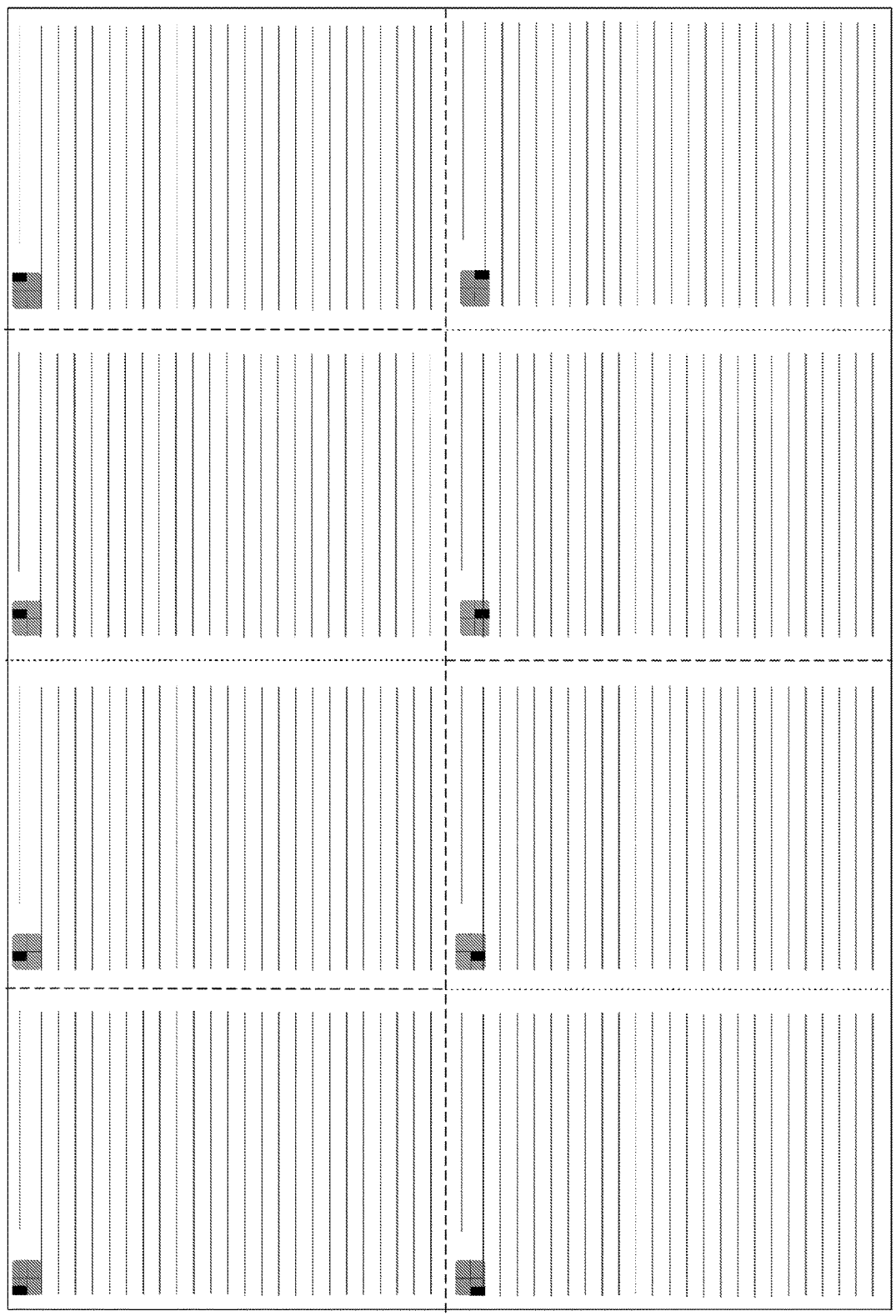
FIG. 21 is an expanded view for showing the notebook 13 in accordance with the embodiment 8 of the present invention and showing eight pages printed in the back side.

FIG. 20 and FIG. 21 are expanded views of the notebook 13 in accordance with the embodiment 8 of the present invention and having a relationship of front-and-back to each other. In the expanded views, dotted lines show the mountain fold, and broken lines show the valley fold. These dotted lines and broken lines are not printed in the real product. The notebook 13 of the embodiment 8 is approximately same as the notebook of the embodiment 6, but differs in that an icon is printed in the upper left corner of each page in place of the identification mark. The embodiment 8 is identical to the embodiment 8 except the icon.

This icon functions as the identifier that can specify the position of a page in the entirety of the expanded view (unfolded paper). Each icon represents the entirety of the expanded view and is partitioned into the same number of areas as there are pages. One area of each icon is differentiated from the other areas in correspondence with the position of the page containing this each icon in the entirety of the expanded view. A user can grasp the position of that page in the entirety of the expanded view with reference to this differentiated area.

Namely, as illustrated in FIG. 20 and FIG. 21, this notebook provides eight pages partitioned by the folding lines in the fully-opened state. There are sixteen pages in both sides. Ruled lines are printed on each page on whose upper left corner an icon is printed. FIG. 20 and FIG. 21 appear identical to each other in the black-and-white drawings except that the dotted lines and the broken lines replace each other. However, in the actual product, the icons on the front side are printed in blue, and the icons on the back side are printed in red. A user can thereby distinguish the front and back sides by the color of the icons.

In the case of icons for use in the embodiment 8 of the present invention, the position of each page in the expanded view (for example, the entirety of the fully-expanded A2 quality paper) is represented by the position of the high density area in the icon of each page. In other words, the position of each page in the entirety of the expanded view corresponds to the position of the high density area in the entirety of the icon. For example, the page having identification mark A-1 of the embodiment 6 is located in the upper left corner of the entirety of the expanded view. Accordingly, while the rectangular icon is printed in pale blue (pale gray in the figure) on the upper left corner of the page, an upper left area of this rectangular icon is colored dark blue (dark gray in the figure).

More specifically speaking, the rectangular icon is vertically halved and horizontally quartered to partition the entirety into eight equal areas in correspondence with the arrangement of the pages in the entirety of the expanded view, and one of the eight equal areas is colored into a high density area (dark gray or dark red) in correspondence with the position of the page. By this configuration, for example, even if the paper is folded in order that only the upper left page appears, a user can grasp that this page is positioned in the upper left corner in the entirety.

Accordingly, no matter which page appears upward, a user can know this page out of the sixteen pages with reference to the position of the high density area and the color of the icon.

Embodiment 9

Figure 22:
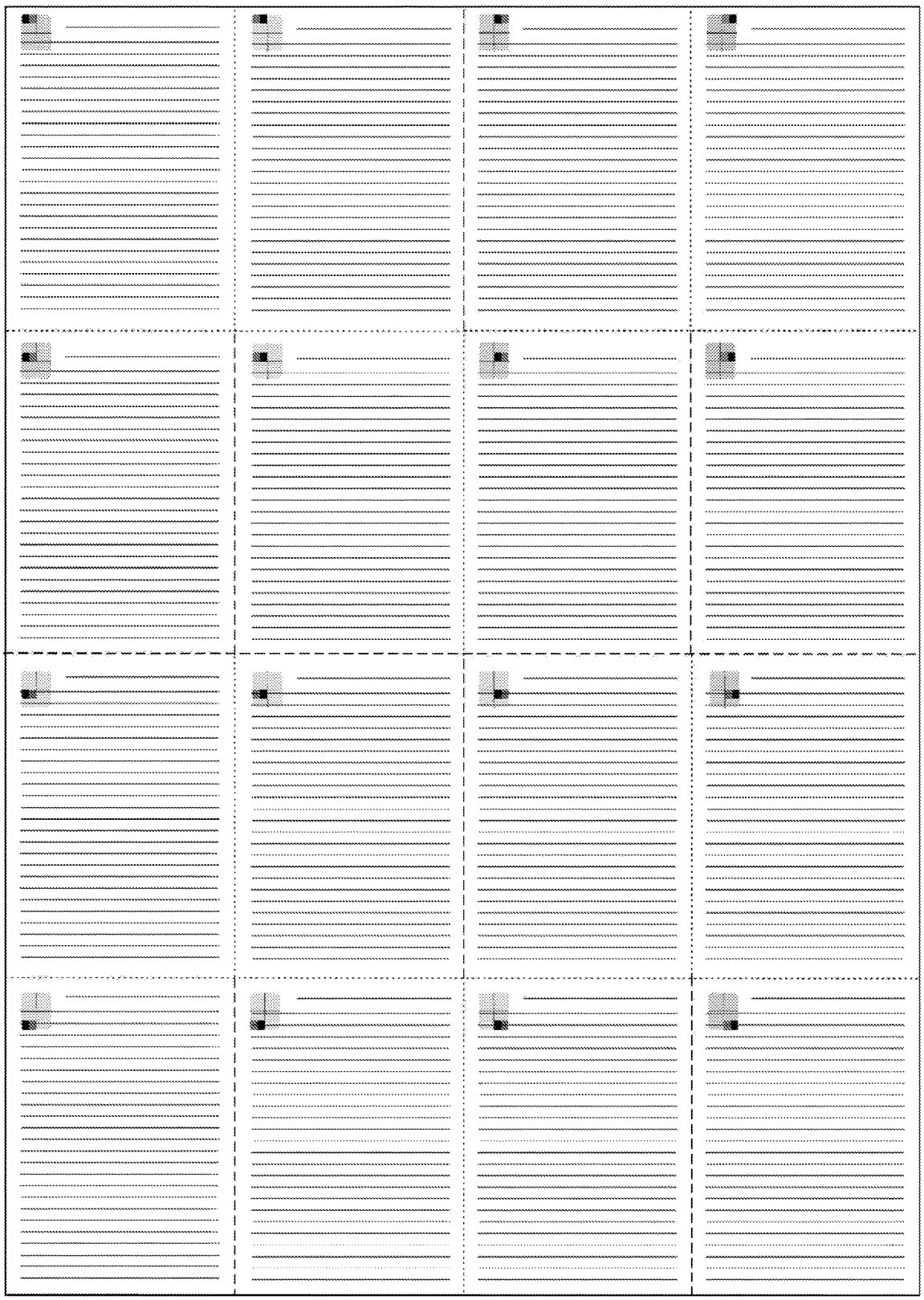
FIG. 22 is an expanded view for showing a notebook 14 in accordance with an embodiment 9 of the present invention and showing sixteen pages printed in the front side.
Figure 23:
FIG. 23 is an expanded view for showing the notebook 14 in accordance with the embodiment 9 of the present invention and showing sixteen pages printed in the back side.

FIG. 22 and FIG. 23 are expanded views of the notebook 14 in accordance with the embodiment 9 of the present invention and having a relationship of front-and-back to each other. In the expanded views, dotted lines show the mountain fold, and broken lines show the valley fold. These dotted lines and broken lines are not printed in the real product. The notebook 14 is approximately same as the notebook of the embodiment 7, but differs in that an icon is printed in the upper left corner of each page in place of the identification mark. The embodiment 9 is identical to the embodiment 7 except the icon.

As illustrated in FIG. 22 and FIG. 23, this notebook consists of sixteen pages partitioned by folding lines in the fully-opened state. There are 32 pages in both sides. Ruled lines are printed on each page on whose upper left corner an icon is printed. FIG. 22 and FIG. 23 appear identical to each other in the black-and-white drawings except that the dotted lines and the broken lines replace each other. However, in the actual product, the icons on the front side are printed in blue, and the icons on the back side are printed in red. A user can thereby distinguish the front and back sides by the color of the icons.

Like the embodiment 8, in the case of icons for use in the embodiment 9 of the present invention, the position of each page in the expanded view (for example, the entirety of the fully-expanded A2 quality paper) is represented by the high density area in the icon of each page. In other words, the position of each page in the entirety of the expanded view corresponds to the position of the high density area in the entirety of the icon. More specifically speaking, the rectangular icon is vertically quartered and horizontally quartered to partition the entirety into sixteen equal areas in correspondence with the arrangement of the pages in the entirety of the expanded view, and one of the eight equal areas is colored into a high density area (dark gray or dark red) in correspondence with the position of the page. Accordingly, no matter which page appears upward, a user can know this page out of the 32 pages with reference to the position of the high density area and the color of the icon.

Embodiment 10

Figure 24:
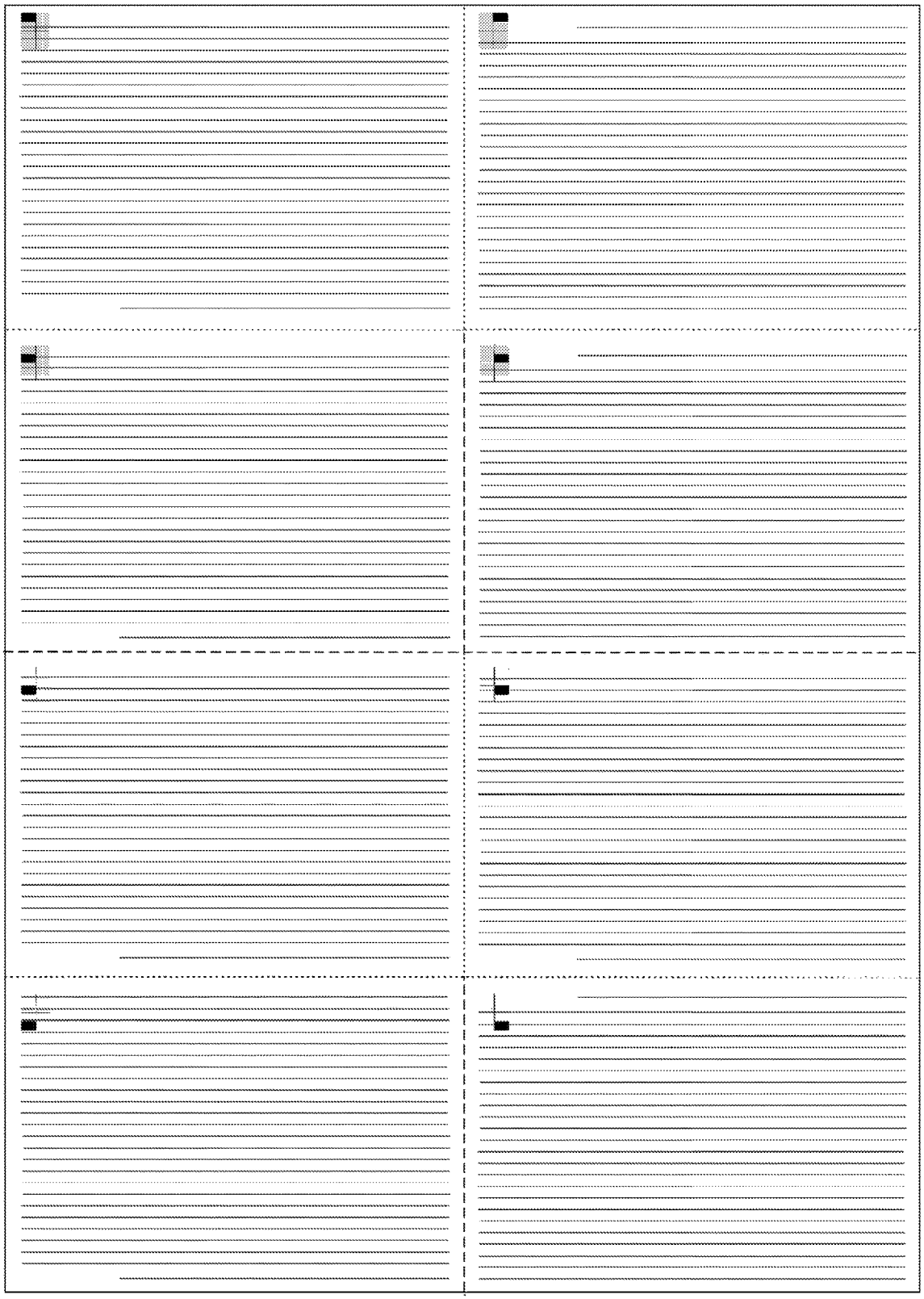
FIG. 24 is an expanded view for showing a notebook 15 in accordance with an embodiment 10 of the present invention and showing eight pages printed in the front side.
Figure 25:
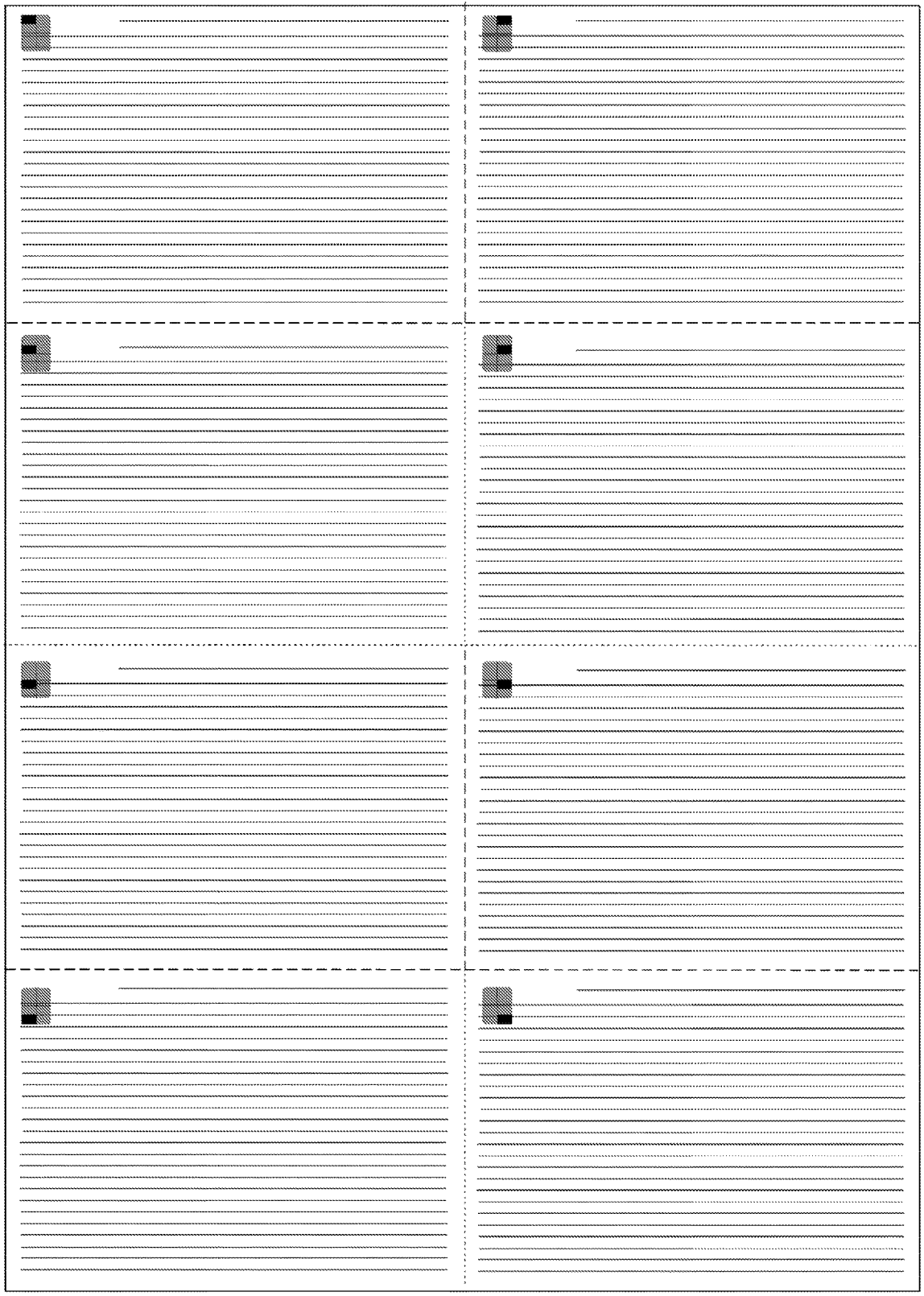
FIG. 25 is an expanded view for showing the notebook 15 in accordance with the embodiment 10 of the present invention and showing eight pages printed in the back side.

FIG. 24 and FIG. 25 are expanded views of the notebook 15 in accordance with the embodiment 10 of the present invention and having a relationship of front-and-back to each other. In the expanded views, dotted lines show the mountain fold, and broken lines show the valley fold. These dotted lines and broken lines are not printed in the real product. The notebook 3 of the embodiment 10 is approximately same as the notebook of the embodiment 7, but differs in that each page is horizontally long. An icon is printed on the upper left corner of each page which is laterally arranged. The embodiment 10 is identical to the embodiment 8 except for the orientation of each page.

As illustrated in FIG. 24 and FIG. 25, this notebook consists of eight pages partitioned by folding lines in the fully-opened state. There are sixteen pages in both sides. Ruled lines are printed on each page on whose upper left corner is printed an icon which is vertically long. FIG. 24 and FIG. 25 appear identical to each other in the black-and-white drawings except that the dotted lines and the broken lines replace each other. However, in the actual product, the icons on the front side are printed in blue, and the icons on the back side are printed in red. A user can thereby distinguish the front and back sides by the color of the icons.

Also in the case of icons for use in the embodiment 10 of the present invention, the position of each page in the expanded view is represented by the high density area in the icon of each page. In other words, the position of each page in the entirety of the expanded view corresponds to the position of the high density area in the entirety of the icon. Accordingly, no matter which page appears upward, a user can know this page out of the sixteen pages with reference to the position of the high density area and the color of the icon.

Embodiment 11

This embodiment 11 is directed to several examples of icons printed in the upper left corner of each page. These examples are explained by the use of icon charts in which only icons are collectively shown. For the purpose of explaining the icon charts, FIG. 26, FIG. 27 and FIG. 28 show icon charts in correspondence with the above embodiments 8, 8 and 9.

Figure 26:
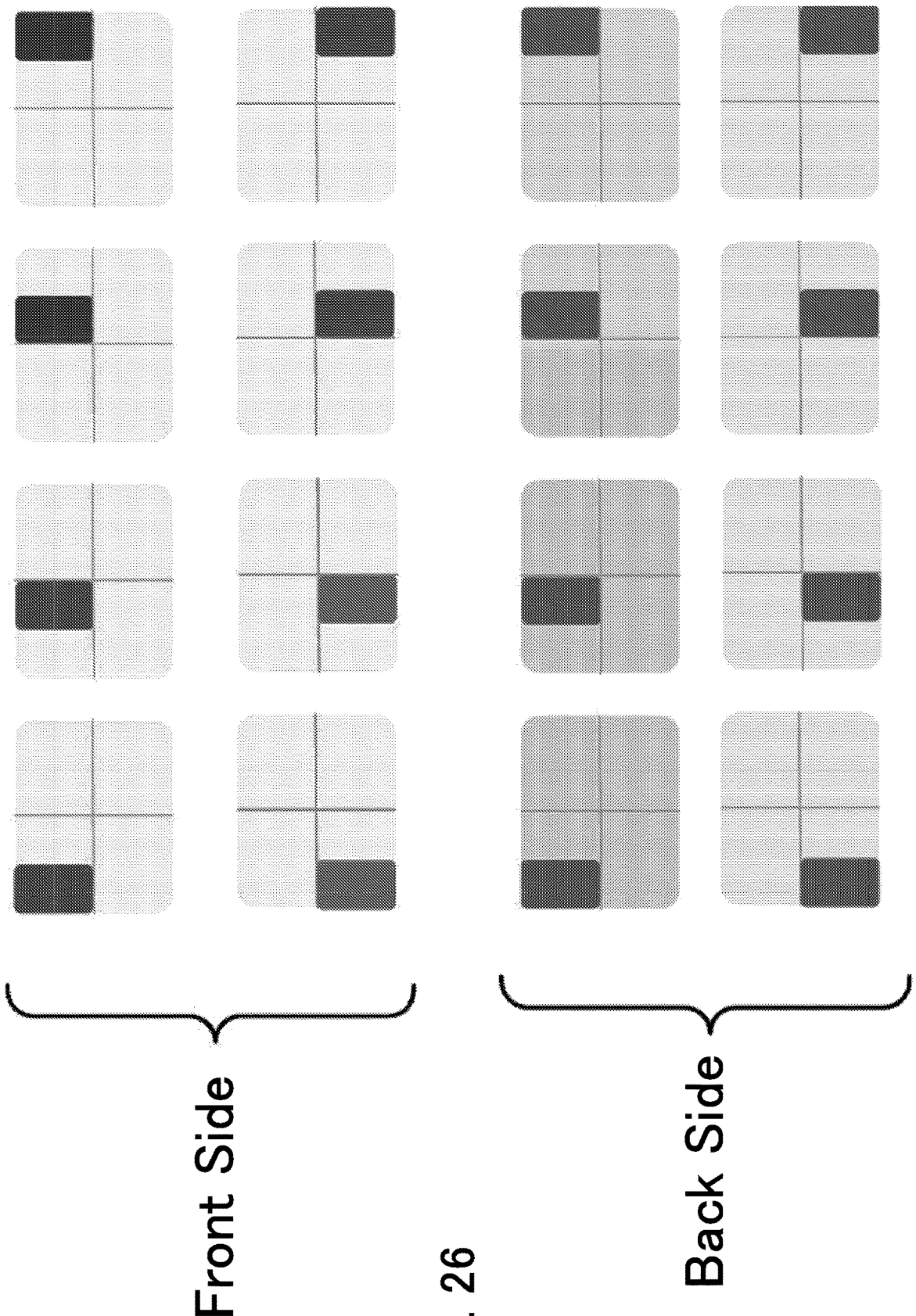
FIG. 26 is a schematic diagram for showing the horizontally long icons used in the sixteen vertically long pages in the both sides of the notebook as illustrated in FIG. 20 and FIG. 21.

FIG. 26 shows the horizontally long icons used in the sixteen vertically long pages in the both sides of the notebook as illustrated in FIG. 20 and FIG. 21. In the upper half, the icons are collectively shown to represent the blue icons printed on the front side of the notebook shown in FIG. 20. Also, in the lower half, the icons are collectively shown to represent the red icons printed on the back side of the notebook shown in FIG. 21.

Figure 27:
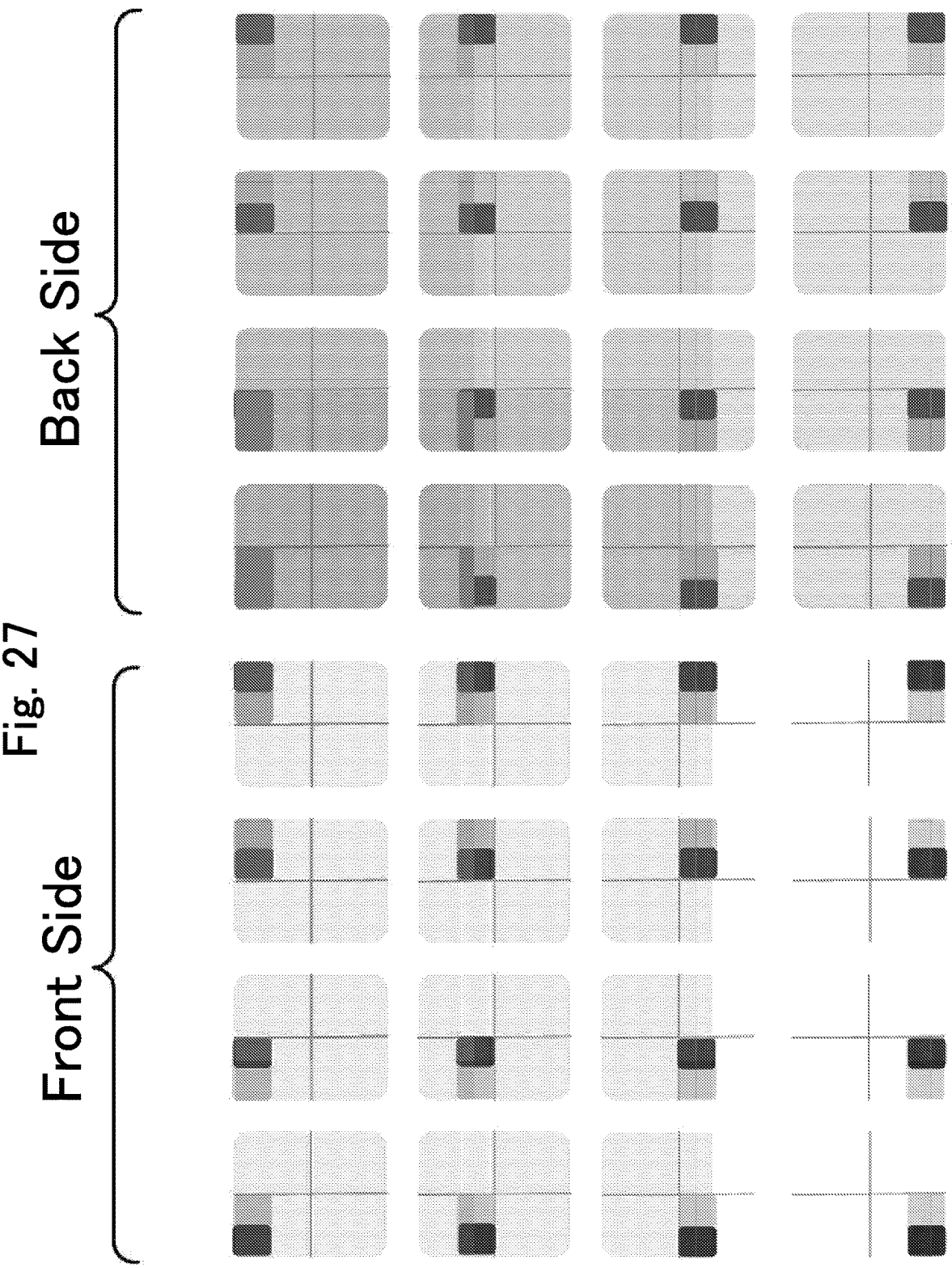
FIG. 27 is a schematic diagram for showing the vertically long icons used in the 32 vertically long pages in the both sides of the notebook as illustrated in FIG. 22 and FIG. 23.

Likewise, FIG. 27 shows the vertically long icons used in the 32 vertically long pages in the both sides of the notebook as illustrated in FIG. 22 and FIG. 23. In the left half, the icons are collectively shown to represent the blue icons printed on the front side of the notebook shown in FIG. 22. In the right half, the icons are collectively shown to represent the red icons printed on the back side of the notebook shown in FIG. 23.

Figure 28:
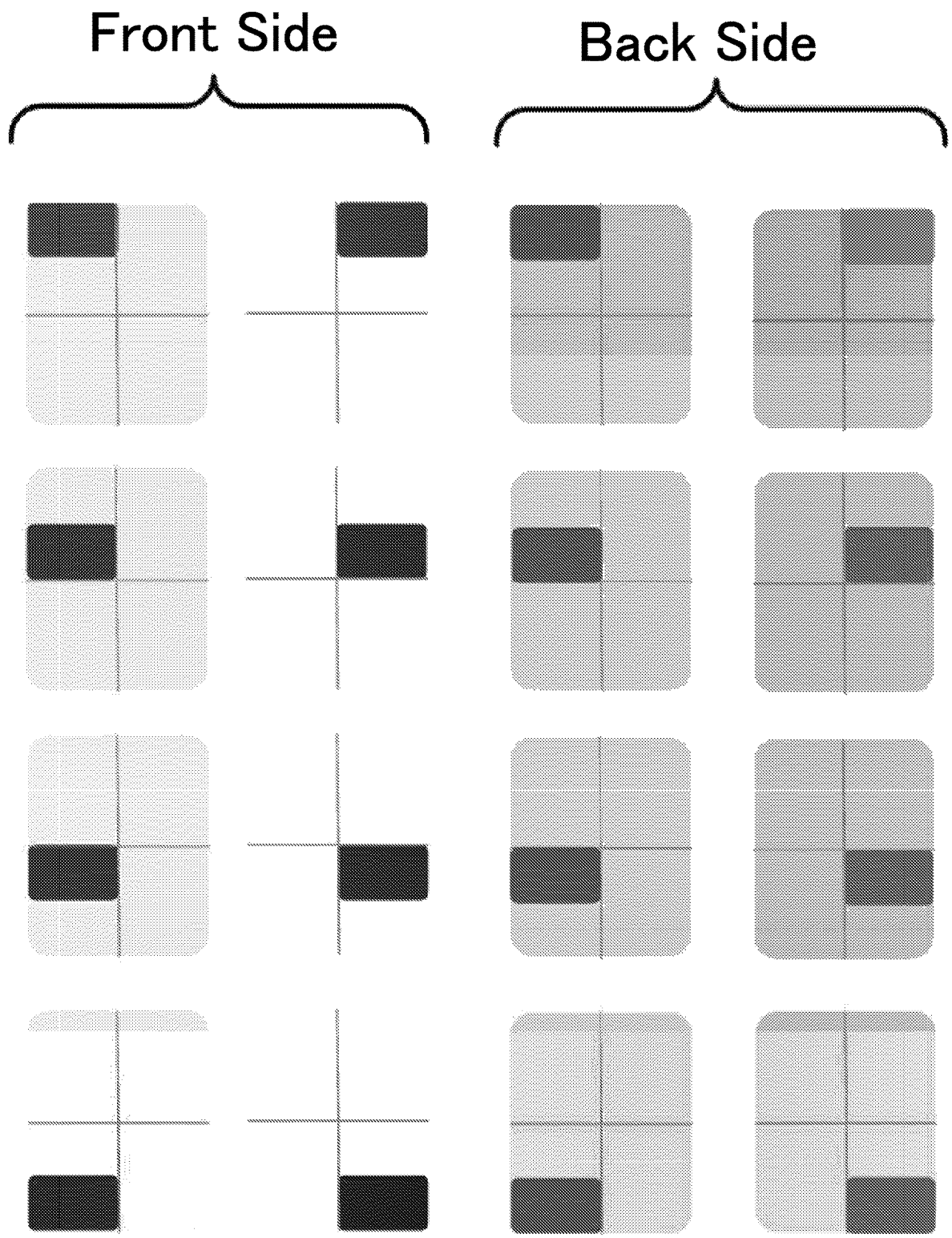
FIG. 28 is a schematic diagram for showing the vertically long icons used in the sixteen horizontally long pages in the both sides of the notebook as illustrated in FIG. 24 and FIG. 25.

Furthermore, FIG. 28 shows the vertically long icons used in the sixteen horizontally long pages in the both sides of the notebook as illustrated in FIG. 24 and FIG. 25. In the left half, the icons are collectively shown to represent the blue icons printed on the front side of the notebook shown in FIG. 24. Also, in the right half, the icons are collectively shown to represent the red icons printed on the back side of the notebook shown in FIG. 25.

Figure 29:
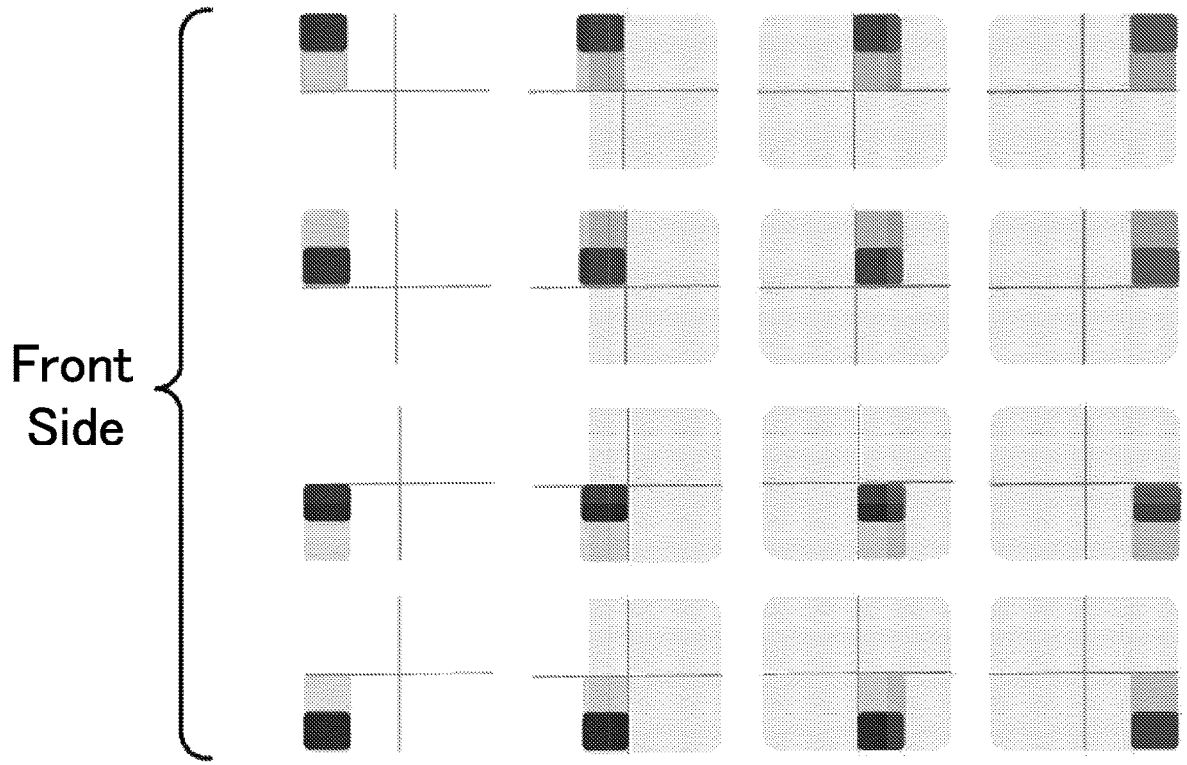
FIG. 29 is a schematic diagram for showing horizontally long icons for use in horizontally long pages.
Figure 29:
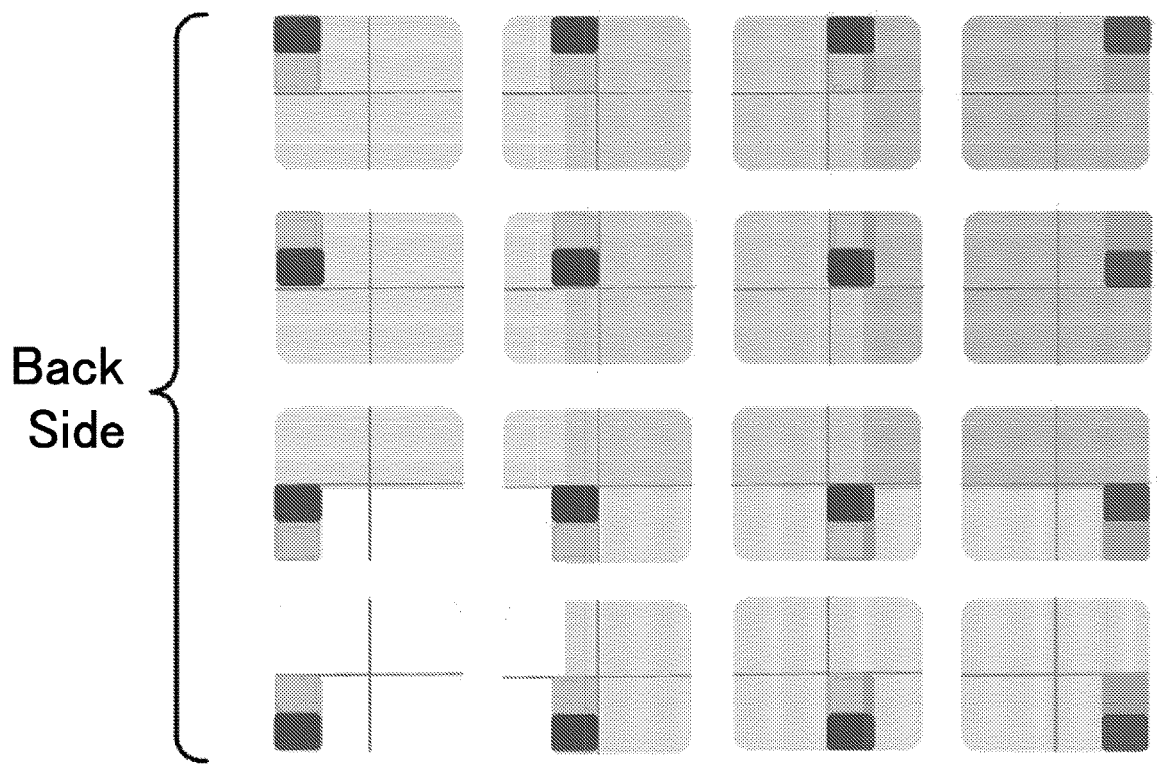

Next, several examples other than the above will be described. FIG. 29 shows horizontally long icons for use in horizontally long pages. In the upper half, the icons are collectively shown to represent the blue icons printed on a front side. Also, in the lower half, the icons are collectively shown to represent the red icons printed on a back side. These icons are used in a notebook having sixteen horizontally long pages.

Figure 30:
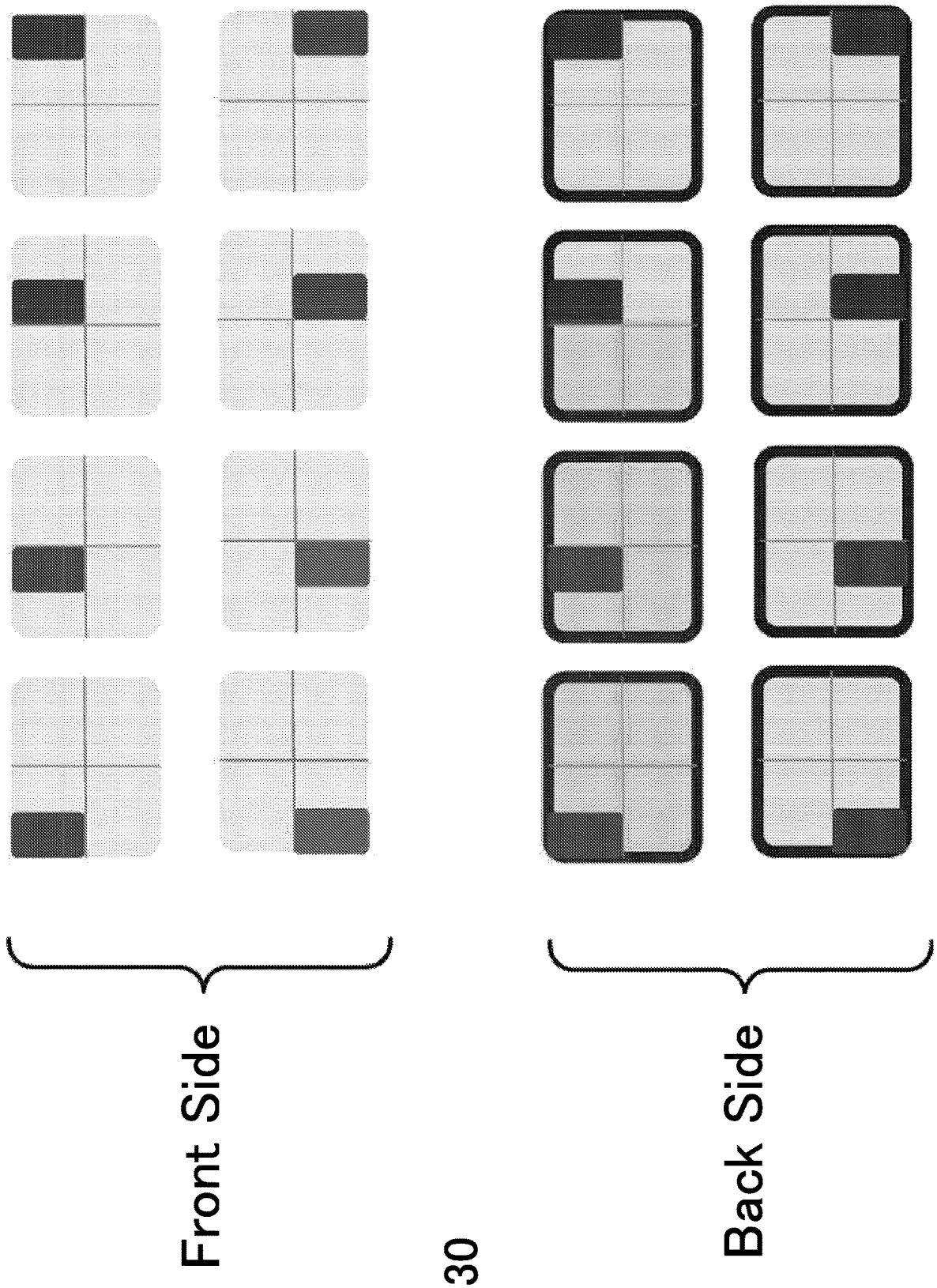
FIG. 30 is a schematic diagram for showing horizontally long icons for use in a notebook having eight vertically long pages in each side in order that the icons in the back side are distinguished by bold black rims.

FIG. 30 shows horizontally long icons for use in a notebook having eight vertically long pages in each side. In the upper half, blue icons printed on the front side of the notebook are collectively shown in the same manner as in the upper half of FIG. 26 showing the front side. On the other hand, in the lower half showing the back side, khaki-colored icons are rimmed with black. Even color weak persons can easily distinguish the front and back sides which are discernable not only in color but also in shape.

Figure 31:
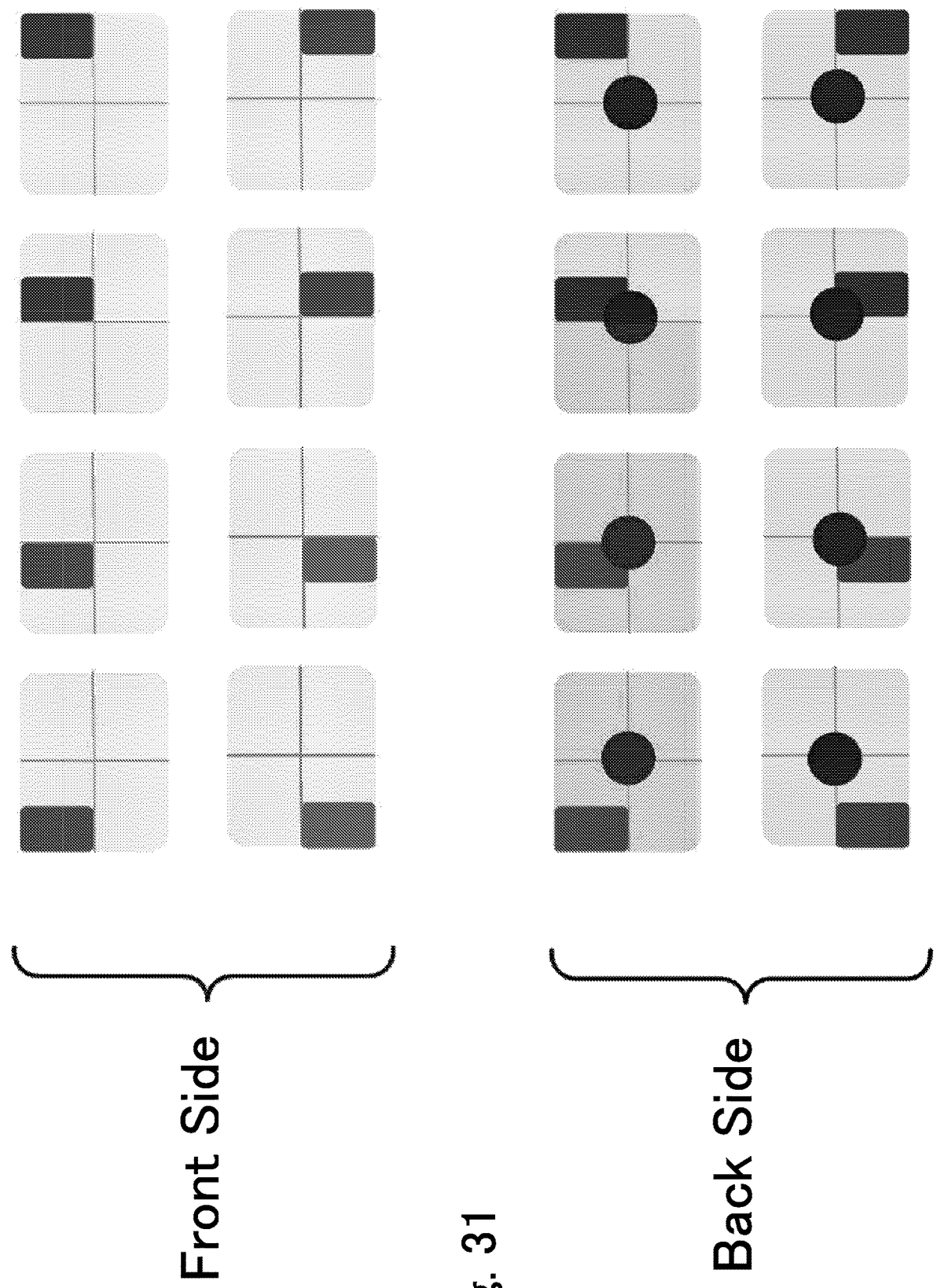
FIG. 31 is a schematic diagram for showing horizontally long icons for use in a notebook having eight vertically long pages in each side in order that the icons in the back side are distinguished by center black circles.

FIG. 31 also shows horizontally long icons for use in a notebook having eight vertically long pages in each side. In the upper half, blue icons printed on the front side of the notebook are collectively shown in the same manner as in the upper half of FIG. 26 showing the front side. On the other hand, in the lower half showing the back side, a black circle is placed on the center of each khaki-colored icon. Also in this case, even color weak persons can easily distinguish the front and back sides which are discernable not only in color but also in shape.

Figure 32:
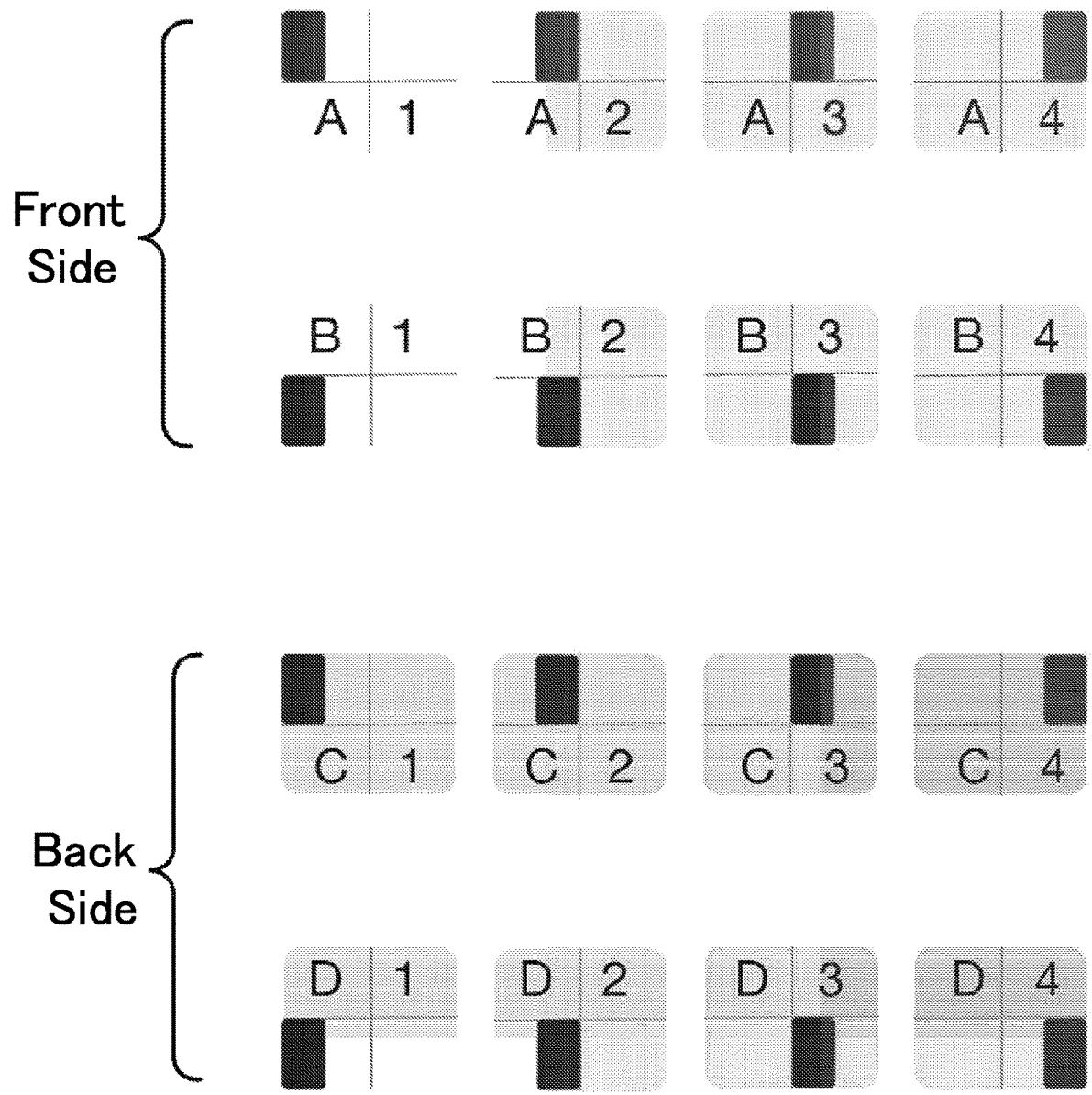
FIG. 32 is a schematic diagram for showing horizontally long icons for use in a notebook having eight vertically long pages in each side in order that the position of a page can be identified also by an identification mark.

FIG. 32 also shows horizontally long icons for use in a notebook having eight vertically long pages in each side. In the upper half, blue icons printed on the front side of the notebook are collectively shown in the same manner as in the upper half of FIG. 26 showing the front side, and provided with identification marks which are used in FIG. 16. On the other hand, in the lower half showing the back side, identification marks are provided on khaki-colored icons in the same manner as in FIG. 17. In this case, the position of each page can be identified not only by the high density area of the icon but also by the identification mark of the page, so that it becomes easier to identify the position.

Embodiment 12

Figure 33:
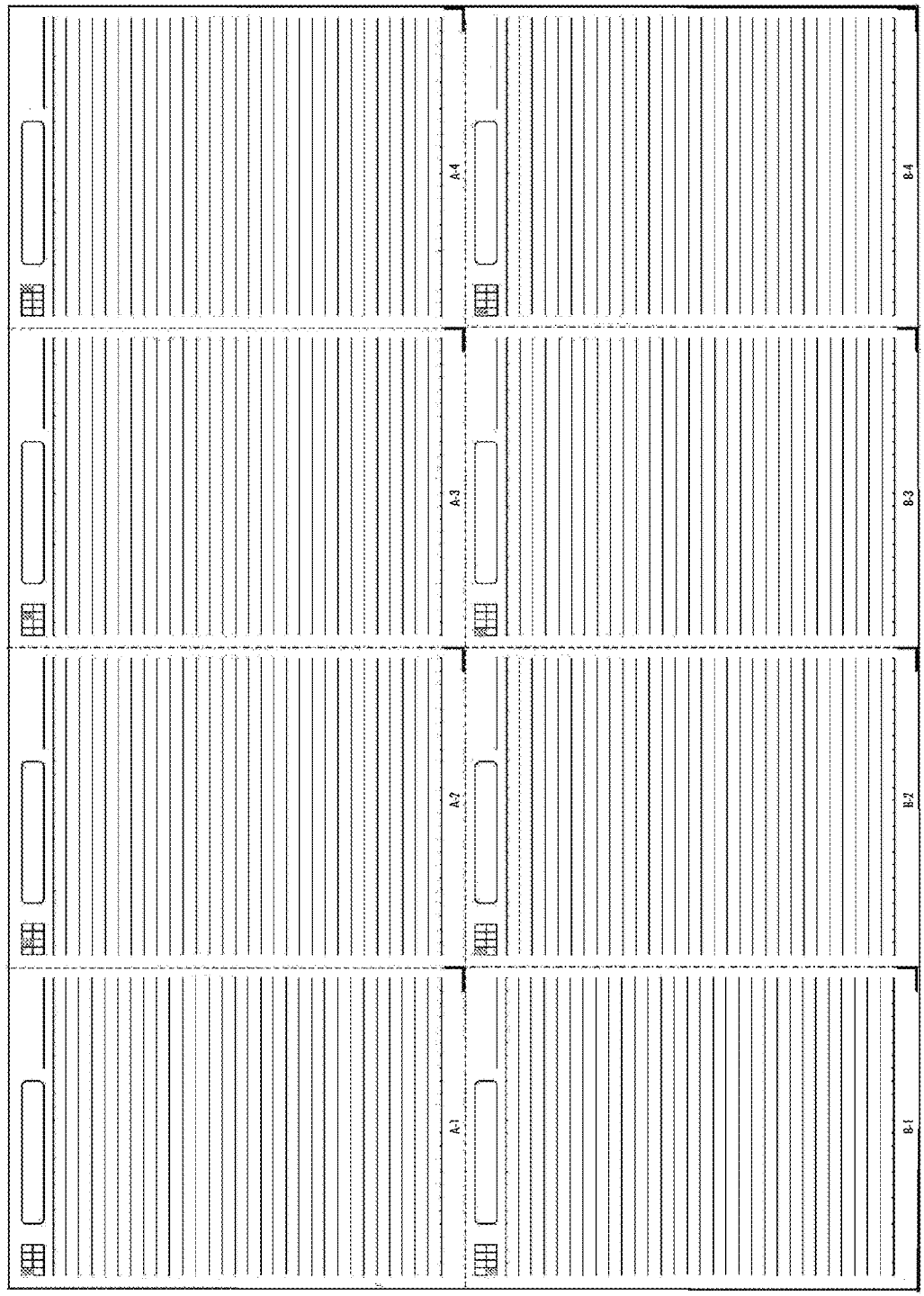
FIG. 33 is an expanded view for showing a notebook 16 in accordance with an embodiment 12 of the present invention and showing eight pages printed in the front side.
Figure 34:
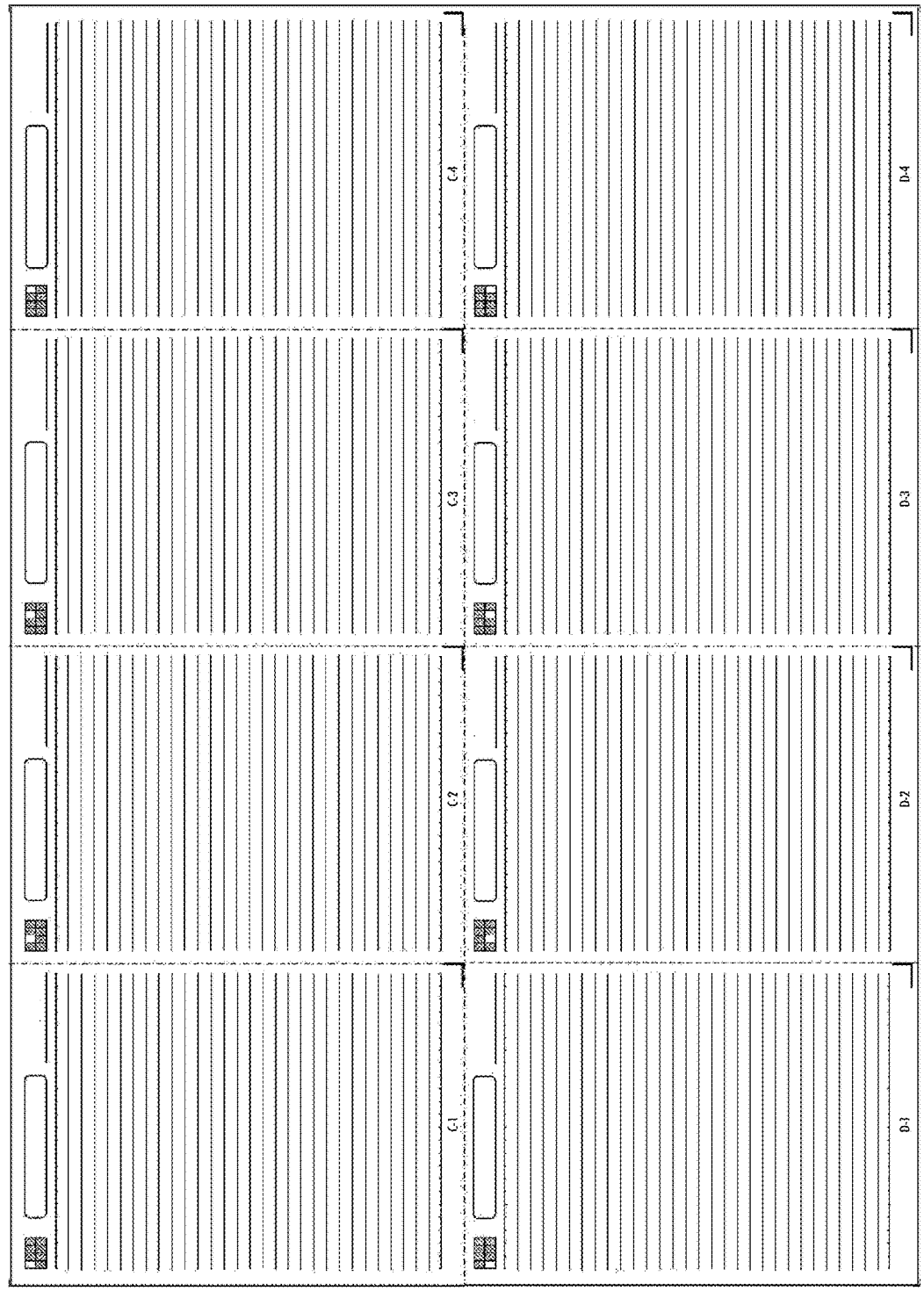
FIG. 34 is an expanded view for showing the notebook 16 in accordance with the embodiment 12 of the present invention and showing eight pages printed in the back side.

FIG. 33 and FIG. 34 are expanded views of the notebook 16 in accordance with the embodiment 12 of the present invention and having a relationship of front-and-back to each other. In the expanded views, dotted lines show the mountain fold, and broken lines show the valley fold. These dotted lines and broken lines are not printed in the real product. Like the notebook 3 of the embodiment 8, an icon is printed in the upper left corner of each page. In addition to this, a title field and a date field are provided on the upper space of each page.

Namely, as illustrated in FIG. 33 and FIG. 34, this notebook provides eight pages partitioned by the folding lines in the fully-opened state. There are sixteen pages in both sides. Ruled lines are printed on each page on whose upper left corner an icon is printed. Furthermore, an identification mark (identifier) is printed in the bottom center position of each page. Namely, identification marks are printed as A-1, A-2, A-3, and A-4 on the upper row of the front side from the left, B-1, B-2, B-3, and B-4 on the lower row of the front side from the left, C-1, C-2, C-3, and C-4 on the upper row of the back side from the left, D-1, D-2, D-3 and D-4 on the lower row of the back side from the left.

In the case of the icons for use in this embodiment of the present invention, the position of each page in the expanded view (for example, the entirety of the fully-expanded A2 quality paper) is represented by the position of the high density area (painted in black) in the icon of each page in FIG. 33. In other words, the position of each page in the entirety of the expanded view corresponds to the position of the high density area in the entirety of the icon. For example, the page having identification mark A-1 of this embodiment is located in the upper left corner of the entirety of the expanded view. Accordingly, the upper left area is made dark in the rectangular icon which is partitioned into eight area and printed on the upper left corner of the page on which this identification mark A-1 is printed. This is similar to the embodiment 8.

On the other hand, in FIG. 34 showing the back side, the position of each page in the expanded view is represented by the low density area (white area) in the icon of each page. Namely, the position of each page in the entirety of the expanded view corresponds to the position of the low density area in the entirety of the icon. For example, the page on which identification mark C-1 is printed in the embodiment 6 is located in the upper left corner of the entirety of the expanded view. Accordingly, the upper left area is made lighter in the rectangular icon which is partitioned into eight area and printed on the upper left corner of the page on which this identification mark C-1 is printed.

Accordingly, no matter which page appears upward, a user can know this page out of the sixteen pages with reference to the positions of the high and low density areas.

Figure 35:
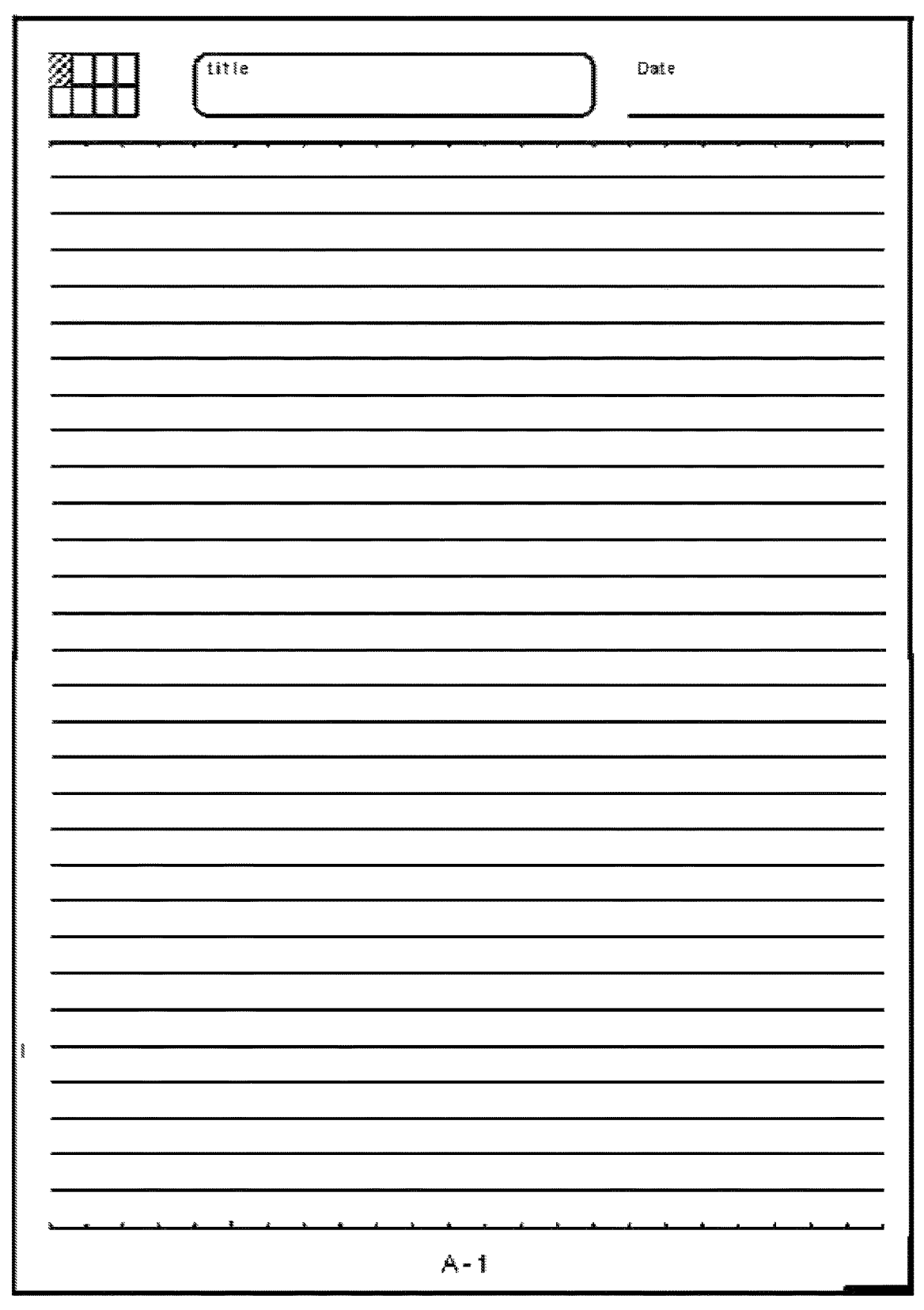
Figure 36:
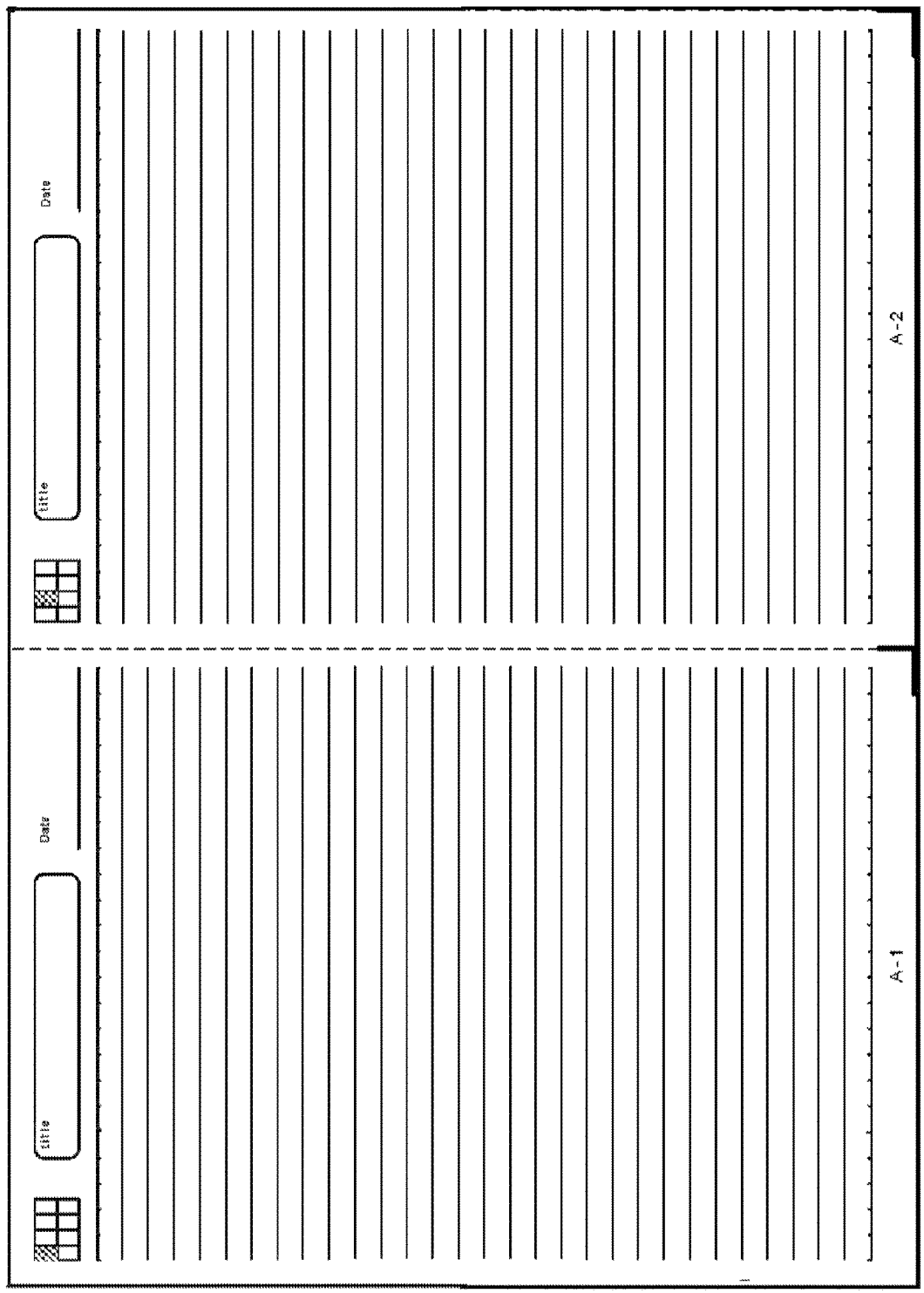
FIG. 36 is a schematic diagram for showing a use state of the notebook 16 in accordance with the embodiment 12 and showing the four folded state of the notebook so that spread two pages can be used.

FIG. 35 shows the eight folded state of the notebook into a small size so that only one page can be used. FIG. 36 shows the four folded state of the notebook so that spread two pages can be used.

Embodiment 13

Figure 37:
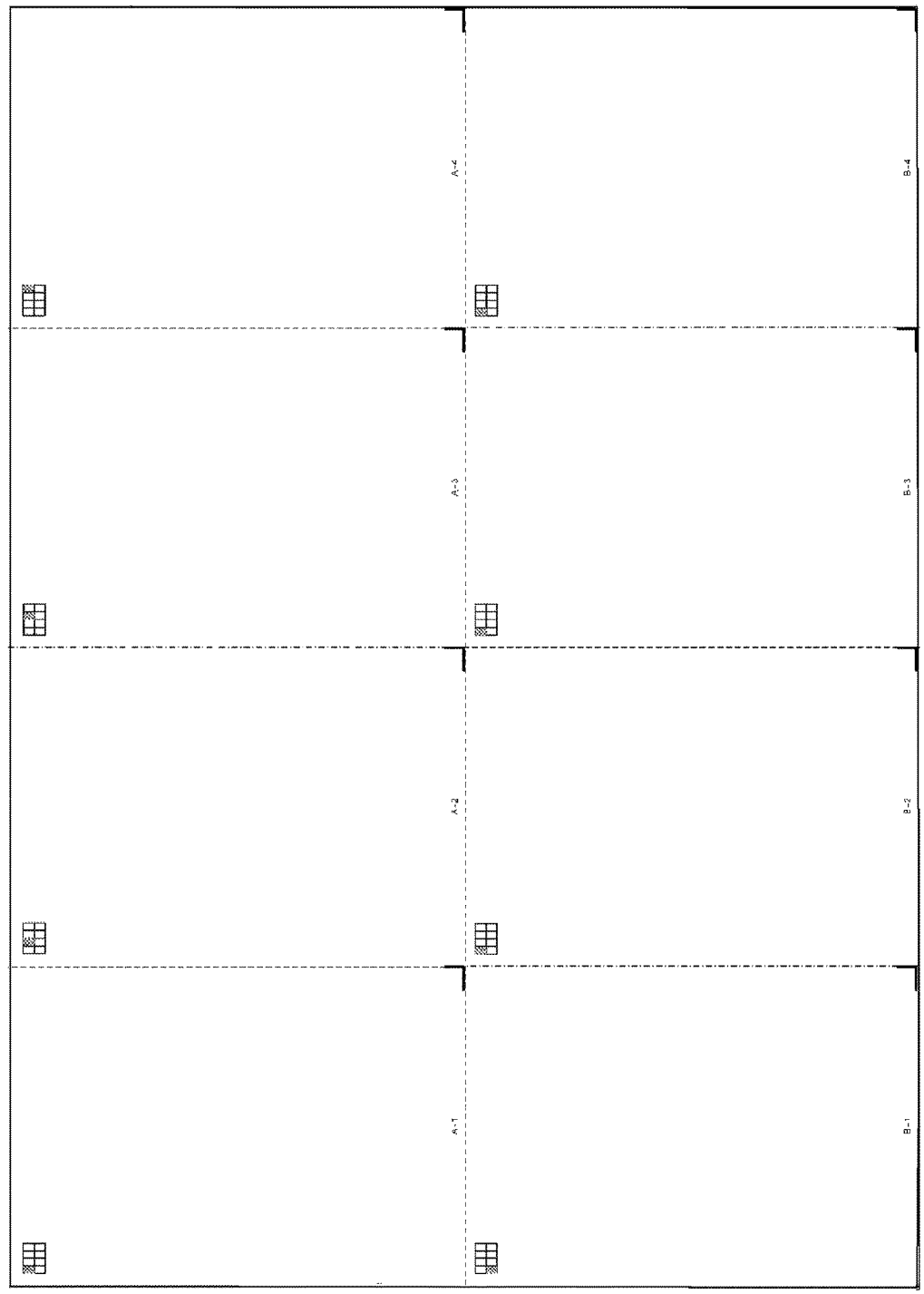
FIG. 37 is an expanded view for showing a notebook 17 in accordance with an embodiment 13 of the present invention and showing eight pages printed in the front side.
Figure 38:
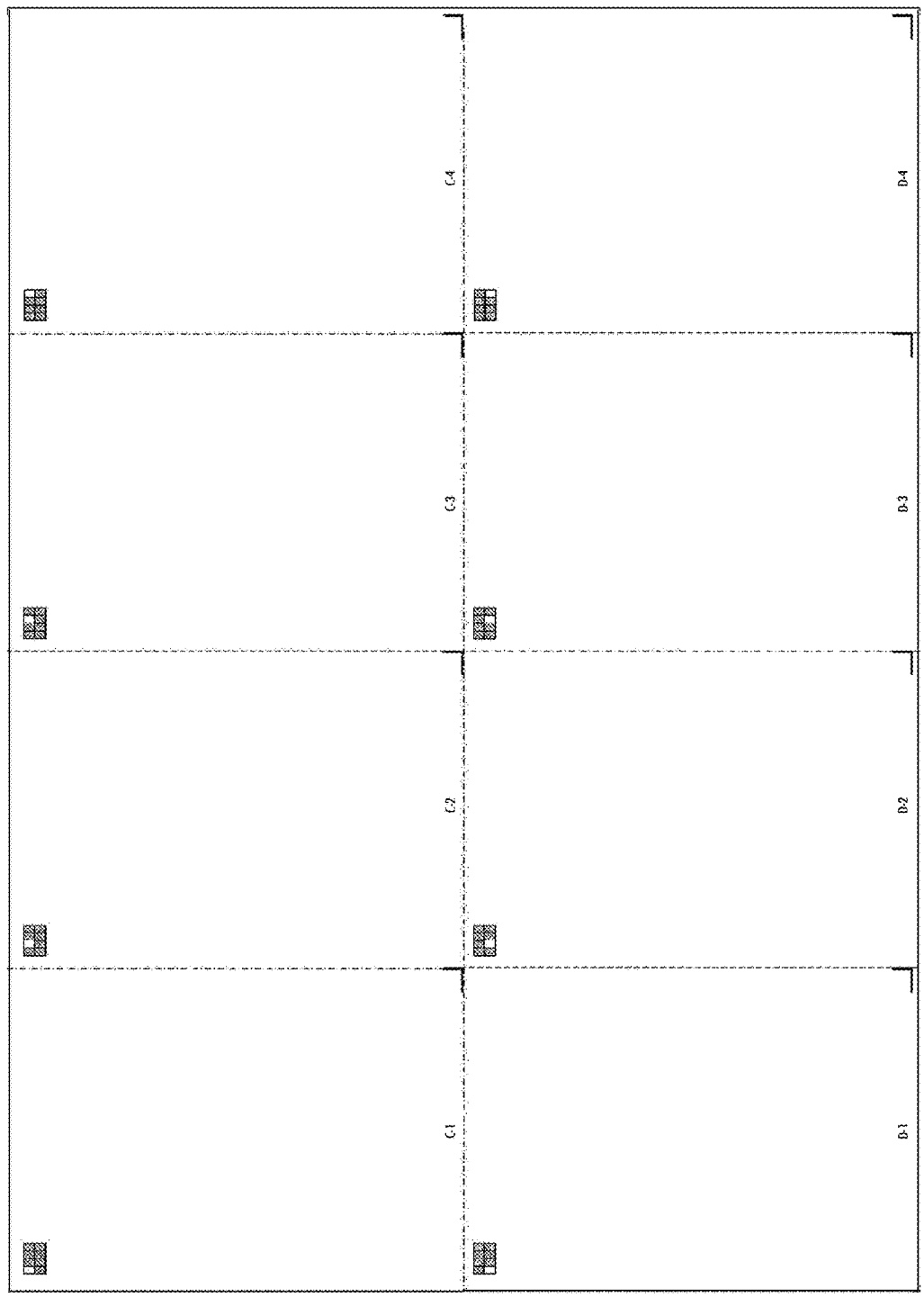
FIG. 38 is an expanded view for showing the notebook 17 in accordance with the embodiment 13 of the present invention and showing eight pages printed in the back side.

FIG. 37 and FIG. 38 are expanded views of the notebook 17 in accordance with the embodiment 13 of the present invention and having a relationship of front-and-back to each other. In the expanded views, dotted lines show the mountain fold, and broken lines show the valley fold. These dotted lines and broken lines are not printed in the real product. An icon is printed in the upper left corner of each page like the notebook 3 of the embodiment 8, but a title field and a date field are not provided on the upper space of each page.

Figure 39:
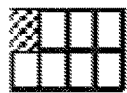
FIG. 39 is a schematic diagram for showing a use state of the notebook 17 in accordance with the embodiment 13 and showing the eight folded state of the notebook into a small size so that only one page can be used.
Figure 40:
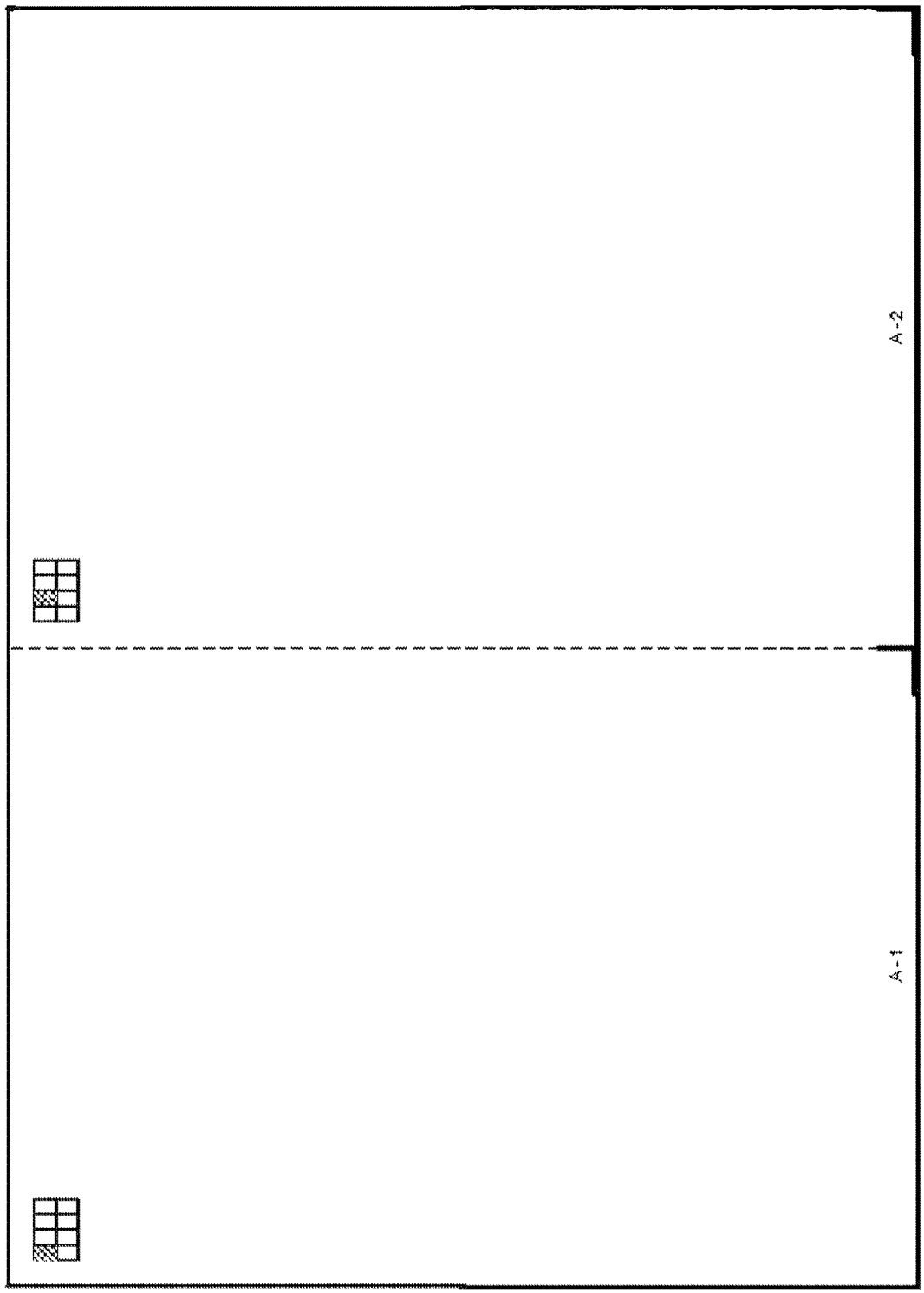
FIG. 40 is a schematic diagram for showing a use state of the notebook 17 in accordance with the embodiment 13 and showing the four folded state of the notebook so that spread two pages can be used.

FIG. 39 shows the eight folded state of the notebook in a small size so that only one page can be used. FIG. 40 shows the four folded state of the notebook so that spread two pages can be used.

As has been discussed above, in accordance with the portable calendar of the present invention, the calendar becomes more compact and suitable for portable use, and it is easy to view a plurality of months of the calendar and write a memo or the like through months so that it is useful for schedule management or the like.

Also, in accordance with the notebook of the present invention, a user can easily and effectively write relevant items over a plurality of pages. Furthermore, the notebook of the present invention is excellent in browsability and portability.

EXPLANATION OF SYMBOLS 1, 2, 3, 4 and 5 . . . portable calendar
b1, b2, b3 and b4 . . . broken line showing valley fold
d1, d2, d3, d4 and d5 . . . dotted lines showing mountain fold
11, 12, 13, 14, 15, 16 and 17 . . . notebook

The invention claimed is:

1. A notebook comprising a rectangular paper sheet folded in eight or sixteen in order that the rectangular paper sheet is divided into four equal parts along one side of the rectangular paper sheet and divided into two or four equal parts along the other side of the rectangular paper sheet,
   wherein each of front and back sides of the rectangular paper sheet is equally partitioned by folding lines into areas each of which serves as a page in which characters or the like can be written,
   wherein an identifier is printed on each page in order to identify the position of the each page in the entirety of the rectangular paper sheet; and
   wherein the identifier comprises an icon printed on one corner of each page, and wherein the icon represents the entirety of the rectangular sheet as a reduced area in which the position corresponding to the page is visually differentiated in order that it can be discerned.

2. The notebook of claim 1, wherein the icon has a high density area whose position in the entirety of the icon corresponds to the position of the each page in the entirety of the rectangular paper sheet.

3. The notebook of claim 1, wherein each icon is partitioned into the same number of areas as there are pages included in the rectangular paper sheet, wherein the pages in the rectangular paper sheet correspond to the areas in each icon respectively, wherein one area of each icon is differentiated from the other areas, and wherein the position of a page in the rectangular paper sheet corresponds to the position of the one area in the icon printed in this page.

* * * * *